US011283343B2

(12) United States Patent
Deng et al.

(10) Patent No.: US 11,283,343 B2
(45) Date of Patent: Mar. 22, 2022

(54) EXTREMUM LOCATOR WITH MEASUREMENT ENABLE CIRCUIT

(71) Applicant: Power Integrations, Inc., San Jose, CA (US)

(72) Inventors: Edward Er Deng, Los Altos, CA (US); Feng Tian, Sunnyvale, CA (US); Vikram Balakrishnan, Redwood City, CA (US); Alex B. Djenguerian, Saratoga, CA (US)

(73) Assignee: POWER INTEGRATIONS, INC., San Jose, CA (US)

( * ) Notice: Subject to any disclaimer, the term of this patent is extended or adjusted under 35 U.S.C. 154(b) by 42 days.

(21) Appl. No.: 16/711,827

(22) Filed: Dec. 12, 2019

(65) Prior Publication Data

US 2021/0184556 A1 Jun. 17, 2021

(51) Int. Cl.
*H02M 1/08* (2006.01)
*H02M 3/335* (2006.01)
*H02M 1/00* (2006.01)

(52) U.S. Cl.
CPC ......... *H02M 1/08* (2013.01); *H02M 3/33576* (2013.01); *H02M 1/0054* (2021.05)

(58) Field of Classification Search
CPC .............. H02M 1/08; H02M 3/33576; H02M 2001/0054
See application file for complete search history.

(56) References Cited

U.S. PATENT DOCUMENTS 3,882,370 A   5/1975  McMurray
5,430,633 A * 7/1995  Smith ............... H02M 3/33569
                                                    363/20

(Continued)

FOREIGN PATENT DOCUMENTS

CN    102237798 A    11/2011
CN    102273057 A    12/2011
         (Continued)

OTHER PUBLICATIONS

C2171/2 Datasheet Primary Side Sensing SMPS Controller, Jun. 6, 2014, 13 pages.

(Continued)

*Primary Examiner* — Shawki S Ismail
*Assistant Examiner* — Monica Mata
(74) *Attorney, Agent, or Firm* — Power Integrations, Inc.

(57) ABSTRACT

A controller for use in a power converter for transferring energy between an input and an output, the controller comprising a second controller to generate a request event and a request signal in response to a feedback signal and a switching window signal, the second controller to transmit the request event during a switching window of the switching window signal. The second controller comprising an extremum locator switching window generator to generate the switching window corresponding with an extremum in the winding signal and a measurement enable circuit to output an enable signal to enable the extremum locator switching window generator to measure a duration of a half cycle to generate the switching window. The measurement enable circuit to enable the extremum locator switching window generator in response to the feedback signal reaching a percentage of a target reference and output a quiet signal to prevent transmitting the request event.

14 Claims, 8 Drawing Sheets

(56) References Cited

U.S. PATENT DOCUMENTS

| | | | |
|---|---|---|---|
| 5,963,438 | A | 10/1999 | Chen |
| 6,456,106 | B1 | 9/2002 | Yee |
| 6,995,991 | B1 | 2/2006 | Yang et al. |
| 7,245,487 | B2 | 7/2007 | Yagi et al. |
| 7,248,487 | B1 | 7/2007 | Indika De Silva et al. |
| 7,471,530 | B2 | 12/2008 | Balakrishnan et al. |
| 7,570,497 | B2 | 8/2009 | Jacques et al. |
| 7,952,895 | B2 | 5/2011 | Matthews |
| 7,995,359 | B2 | 8/2011 | Djenguerian et al. |
| 8,077,483 | B2 | 12/2011 | Djenguerian et al. |
| 8,077,484 | B2 | 12/2011 | Djenguerian et al. |
| 8,077,486 | B2 | 12/2011 | Djenguerian et al. |
| 8,385,088 | B2 | 2/2013 | Bailey et al. |
| 8,693,217 | B2 | 4/2014 | Mao |
| 8,755,203 | B2 | 6/2014 | Li et al. |
| 8,937,817 | B2 | 1/2015 | Fornage et al. |
| 9,071,152 | B2 | 6/2015 | Morong et al. |
| 9,136,765 | B2 | 9/2015 | Balakrishnan et al. |
| 9,178,411 | B2 | 11/2015 | Djenguerian et al. |
| 9,184,668 | B2 | 11/2015 | Telefus |
| 9,219,419 | B2 | 12/2015 | Halberstadt |
| 9,374,011 | B2 | 6/2016 | Liu et al. |
| 9,444,357 | B1 * | 9/2016 | Matthews ............ H02M 3/3353 |
| 9,722,506 | B2 | 8/2017 | Pastore et al. |
| 9,742,288 | B2 | 8/2017 | Balakrishnan et al. |
| 10,186,976 | B2 | 1/2019 | Duvnjak |
| 10,554,134 | B2 | 2/2020 | Werner et al. |
| 10,554,136 | B1 | 2/2020 | Miletic |
| 2008/0123377 | A1 | 5/2008 | Lin |
| 2008/0123380 | A1 | 5/2008 | Park et al. |
| 2008/0272751 | A1 | 11/2008 | Allinder et al. |
| 2008/0278975 | A1 | 11/2008 | Degen et al. |
| 2009/0268487 | A1 | 10/2009 | Park |
| 2010/0046258 | A1 | 2/2010 | Coulson et al. |
| 2010/0110732 | A1 | 5/2010 | Moyer et al. |
| 2011/0080110 | A1 | 4/2011 | Nuhfer et al. |
| 2011/0267856 | A1 | 11/2011 | Pansier |
| 2012/0230064 | A1 | 9/2012 | Yang et al. |
| 2013/0077355 | A1 | 3/2013 | Djenguerian et al. |
| 2013/0121049 | A1 | 5/2013 | Shi et al. |
| 2014/0003096 | A1 | 1/2014 | Deng |
| 2014/0036550 | A1 | 2/2014 | Yang et al. |
| 2014/0098578 | A1 | 4/2014 | Halberstadt |
| 2014/0098579 | A1 | 4/2014 | Kleinpenning |
| 2014/0204623 | A1 | 7/2014 | Djenguerian et al. |
| 2014/0268911 | A1 | 9/2014 | Telefus |
| 2014/0361618 | A1 | 12/2014 | Ananth |
| 2015/0061912 | A1 | 3/2015 | Bodano et al. |
| 2015/0280584 | A1 | 10/2015 | Gong et al. |
| 2015/0326008 | A1 | 11/2015 | Bäurle et al. |
| 2016/0056704 | A1 | 2/2016 | Deboy |
| 2016/0072399 | A1 | 3/2016 | Kikuchi et al. |
| 2016/0111961 | A1 * | 4/2016 | Balakrishnan .... H02M 3/33592 363/21.12 |
| 2016/0329751 | A1 | 11/2016 | Mach et al. |
| 2018/0241299 | A1 * | 8/2018 | Jitaru ................ H02M 3/33592 |

FOREIGN PATENT DOCUMENTS

| | | |
|---|---|---|
| CN | 103715901 A | 4/2014 |
| CN | 103715910 A | 4/2014 |
| CN | 104038066 A | 9/2014 |
| EP | 2383876 A1 | 11/2011 |
| EP | 2383876 A2 | 11/2011 |
| EP | 2717450 A1 | 4/2014 |
| EP | 2757675 A2 | 7/2014 |
| EP | 2717450 B1 | 12/2016 |
| EP | 3116179 A1 | 1/2017 |
| EP | 2757675 B1 | 4/2019 |
| JP | 2001298949 A | 10/2001 |
| JP | 2009106028 A | 5/2009 |
| JP | 2013528342 A | 7/2013 |
| TW | 200824240 A | 6/2008 |

OTHER PUBLICATIONS

C6181 Datasheet Primary Sensing SMPS Regulator for Offline Applications, Aug. 9, 2011, 10 pages.

Chinese Search Report, Application No. 201580057529X, dated Nov. 22, 2019, 3 pages.

India Office Action for Application No. 201717010073, dated Sep. 26, 2019, 6 pages.

LinkSwitch4-Family Energy-Efficient, Accurate Primary-Side Regulated CV/CC Switcher for Adapters and Chargers, Revision F, May 2018, 22 pages.

Second Chinese Office Action, Application No. 20150057529.X, dated Dec. 11, 2019, 13 pages.

EPO Summons to Attend Oral Proceedings, Application No. 15787848. 9, Nov. 5, 2019, 16 pages, Nov. 5, 2019.

Kang, Sang Hee , et al., "Efficiency Optimization in Digitally Controlled Flyback DC-DC Converters Over Wide Ranges of Operating Conditions", Kang et al., "Efficiency Optimization in Digitally Controlled Flyback DC-DC Converters Over Wide Ranges of Operating Conditions," IEEE Transactions on Power Electronics, Nov. 2011, 24 pages.

Decision on Rejection from Chinese Patent Office, Application No. 201580057529.X, dated Dec. 2, 2020, 5 pages.

European Patent Application No. 15787848.9—European Office Action dated May 22, 2018, 4 pages.

International Application No. PCT/US2015/056761—International Search Report and Written Opinion, dated Feb. 24, 2016, 16 pages.

Japanese Patent Application No. 2017-521083—Office Action with English Translation dated Sep. 3, 2019, 8 pages.

Kang, S.H. et al., "Efficiency Optimization in Digitally Controlled Flyback DC-DC Converters Over Wide Ranges of Operating Conditions", IEEE Transactions on Power Electronics, vol. 27, No. 8, Aug. 2012, © 2012 IEEE, pp. 3734-3748.

Machine Translation of Decision on Rejection from Chinese Patent Office, Application No. 201580057529.X, dated Dec. 2, 2020, 5 pages.

PRC (China) Application No. 201580057529.X—Office Action with English Translation dated Feb. 2, 2019, 19 pages.

Third Office Action for Chinese Patent Application No. 201580057529. X, dated Jun. 17, 2020, 14 pages. (Machine Translation).

* cited by examiner

EXTREMUM LOCATOR WITH MEASUREMENT ENABLE CIRCUIT

BACKGROUND OF THE INVENTION

Field of the Invention

The present disclosure relates generally to switched mode power converters, and more specifically to an output-side controller for a switched mode power converter.

Discussion of the Related Art

Electronic devices use power to operate. Switched mode power converters are commonly used due to their high efficiency, small size and low weight to power many of today's electronics. Conventional wall sockets provide a high voltage alternating current. In a switching power converter, a high voltage alternating current (ac) input is converted to provide a well-regulated direct current (dc) output through an energy transfer element. The switched mode power converter controller usually provides output regulation by sensing one or more signals representative of one or more output quantities and controlling the output in a closed loop. In operation, a switch is utilized to provide the desired output by varying the duty cycle (typically the ratio of the on time of the switch to the total switching period), varying the switching frequency, or varying the number of pulses per unit time of the switch in a switched mode power converter.

Typical losses related to switched mode power converters are referred to as conduction losses and switching losses. Switching losses may also be referred to as crossover losses. Conduction losses and switching losses due to the electrical resistance in the circuit and the parasitic capacitance that is switched by the power converter, in particularly the power switch of the power converter. When the power switch of the power converter conducts current, the resistance of the power switch along with the current which passing in the power switch generates conduction loss. Switching losses are generally associated with the losses which occur while the power switch is transitioning between an ON state and an OFF state or vice versa. In one example, a switch that is ON (or closed) may conduct current while a switch that is OFF (or open) cannot conduct current. When the power switch is open, voltage across the switch stores energy in the parasitic capacitance. The parasitic capacitance discharges when the power switch closes, dissipating the energy stored in the parasitic capacitance in the resistance of the power switch to produce switching loss.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
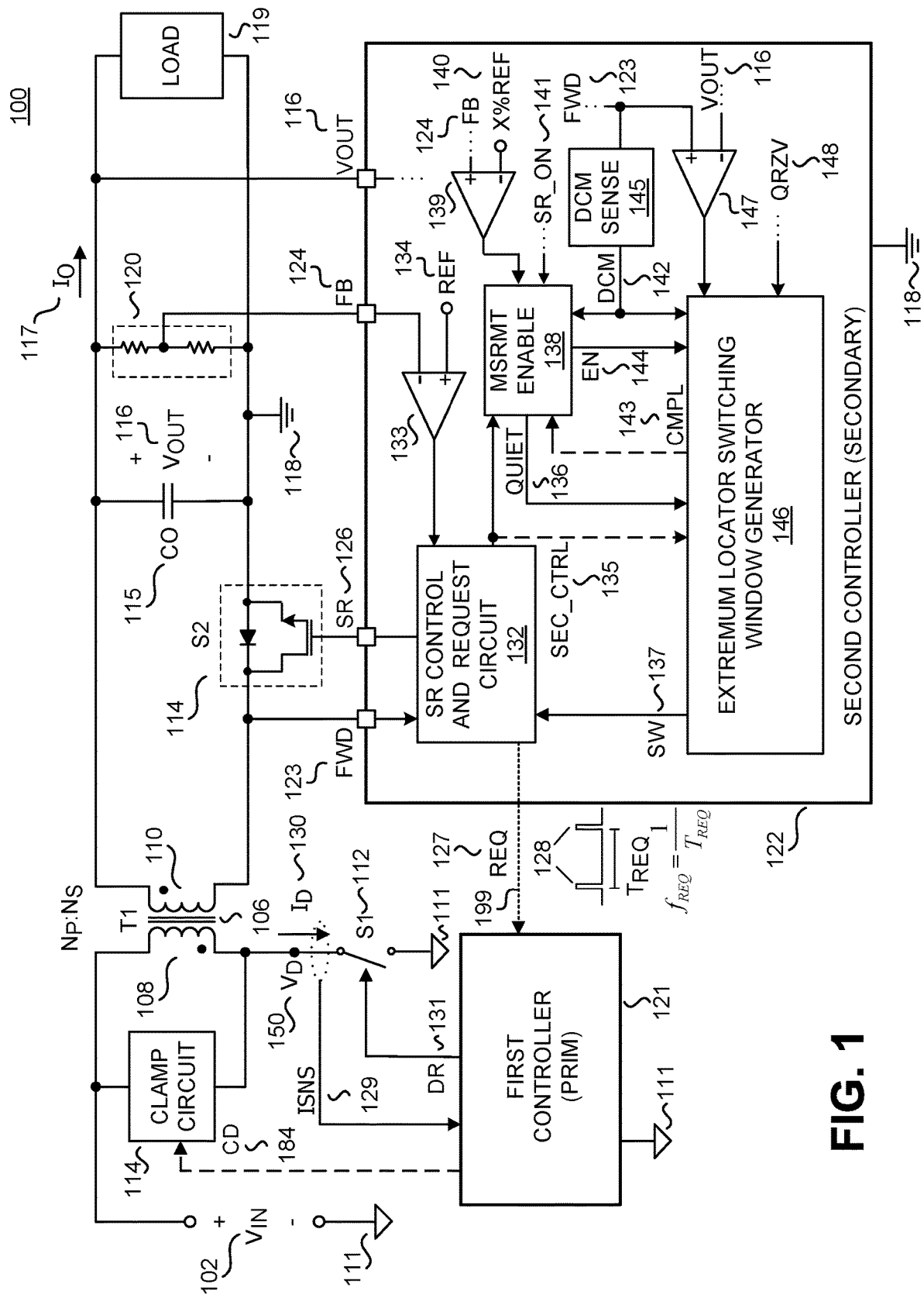
FIG. 1 is a diagram illustrating an example power converter with a first and second controller including an extremum locator switching window generator and measurement enable circuit, in accordance with an embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As mentioned above, one type of loss in power converters is switching loss due to the turning on and off of the power switch. For isolated power converters, high frequency turn on oscillations in the voltage and current of the power switch may occur due to the resonance between the leakage inductance of the transformer of the power converter and the parasitic capacitance of the power switch. Further, when the power converter is operating in discontinuous conduction mode (DCM), another lower frequency oscillation may also occur between the magnetic inductance of the transformer and the parasitic capacitance of the power switch in addition to the high frequency oscillations discussed. In general, operating the power converter to reduce the losses due to the lower frequency oscillation may be referred to as quasi resonance (QR) mode of operation. One method of QR mode of operation for reducing the switching losses related to turning ON the power switch in an isolated power converter operating in DCM may be quasi resonant valley switching of the power switch where an input parameter, such as the current of the power switch, is directly monitored so that a voltage across the power switch is at or near a minimum when the power switch is turned ON.

Safety requirements generally require for the input-side of a power converter to be galvanically isolated from the output-side of the power converter, generally referred to as isolated power converters. Isolated power converters generally utilize high frequency transformers to provide galvanic isolation. Further, some products and applications may require a low regulated output voltage, such as 5 volts (v) and below. In these low voltage cases, a power converter with synchronous rectification may be utilized to achieve higher efficiency and lower form factor for the power converter. Synchronous rectification replaces an output rectifier diode with a synchronized rectifier switch (e.g., a transistor) which is switched to behave like a rectifier to reduce voltage drop and power loss.

For an isolated power converter which includes synchronous rectification, the controller for the power converter generally includes a first controller, referenced to the input-side of the power converter, which controls the switching of the input-side power switch of the power converter to control the transfer of energy between the input and the output side of the power converter. The controller for the power converter may also include a second controller, referenced to the output-side of the power converter and galvanically isolated from the first controller, which controls switching of the synchronous rectifier switch coupled to the output-side of the power converter. The second controller may also sense the output of the power converter and provide output regulation by sending a request event to the first controller to turn on the input-side power switch. A second controller referenced to the output-side of the power converter may provide tighter output regulation and faster response to load transients.

As mentioned above, one method of QR mode of operation for reducing the switching losses may be quasi resonant valley switching of the power switch where the current of the power switch is directly monitored so that a voltage across the power switch is at or near a minimum when the power switch is turned ON. However, for a power converter which utilizes a second controller referenced to the output-side of the power converter to determine when to turn ON the power switch, the second controller does not have direct access to the current of the power switch to determine when to turn ON the power switch. However, an energy transfer element may have an input winding and an output winding and the voltages and currents of the input and output windings are related to the turns ratio of input and output windings. As such, the second controller may indirectly determine the voltage across the power switch by monitoring the output winding of the energy transfer element.

In operation of an example synchronous flyback power converter, the synchronous rectifier switch is conducting (e.g. transferring energy to the output) during at least a portion of the off-time of the power switch. During continuous conduction mode (CCM), the synchronous rectifier switch is still conducting when the power switch turns ON. During discontinuous conduction mode (DCM), the synchronous rectifier switch stops conducing before turning ON the power switch. As such, ringing occurs on the output winding (also referred to as a relaxation ring) due to the secondary parasitic inductances and capacitances. Each peak of the relaxation ring on the output winding represents a valley point of the power switch voltage, and vice versa. The peaks and valleys may be referred to as extremum. As used herein "extremum" or "extrema" includes any local maximum or minimum points or may be referred to as "peaks" and "valleys", where mathematically, the slope (i.e., derivative of the ringing/oscillation waveform) approaches zero. As such, turning on the power switch during an extremum of the output winding may minimize switching losses of the power switch. For QR mode, switching losses may be minimized by turning ON the power switch near the peak of the output winding relaxation ring which represents a valley of the power switch voltage when the power converter is operating in DCM.

Another technique to reduce losses experienced by the power converter is to utilize an active clamp circuit to reduce the switching losses through the use of zero voltage (ZV) switching techniques. Similar to a passive clamp circuit, an active clamp circuit is coupled across the input winding of the energy transfer element of a power converter and includes a switch (such as a transistor) to enable current flow through the active clamp circuit. The switch for the active clamp circuit may be referred to as a clamp switch. The active clamp circuit facilitates the discharge of the parasitic capacitance associated with the power switch and the voltage across the power switch falls to substantially zero prior to the power switch turning ON and as such switching losses may be reduced.

The first and second controller and the power converter can operate in zero voltage switching (ZV) mode in which the clamp switch is turned ON to discharge the parasitic capacitance associated with the power switch prior to the power switch turning ON. Similar to the QR mode, during DCM the second controller monitors the output winding to determine when to turn on the clamp switch and the power switch. For the clamp switch to facilitate the discharge of the parasitic capacitance of the power switch, the voltage across the power switch should be non-zero when the clamp switch turns on. As such, the turning on the clamp switch during an extremum of the output winding may minimize switching losses of the power switch. For ZV mode, switching losses may be minimized by turning ON clamp switch near the valley of the output winding relaxation ring which represents a peak of the power switch voltage when the power converter is operating in DCM.

In embodiments, determining the extremum of the output winding includes measuring the half cycle of the relaxation ring to determine a switching window for the request events in a request signal. The switching window corresponds with the extremum of the output winding. Embodiments discussed herein may include a first controller configured to generate a drive signal to control switching of a power switch to control the transfer of energy between the input and the output of the power converter. The first controller may also generate a clamp drive signal to control the switching of a clamp switch of an active clamp circuit. The outputting of the drive signal and/or the clamp drive signal may be responsive to a request event in the request signal. Embodiments further include a second controller which generates the request signal and the request events. The second controller transmits a request event in the request signal during a switching window of the switching window signal. In embodiments, the switching window correlates with an extremum of a winding signal of the energy transfer element. Embodiments further included a measurement enable circuit which enables the second controller to determine the switching window for the switching window signal. In one embodiment, the second controller measures the half cycle of the relaxation ring to determine the switching window. The measurement enable circuit enables the measurement of the half cycle if the output of the power converter reaches a percentage amount of the target regulation value. Further, in embodiments the measurement enable circuit outputs a quiet signal which prevents the secondary controller from outputting any request events in the request signal. The quiet signal further allows the power converter to operate in DCM such that the half cycle of the relaxation ring may be measured.

To illustrate, FIG. 1 is a diagram of an example power converter 100 with a first controller 121 and second controller 122 including an extremum locator switching window generator 146 and measurement enable circuit 138, in accordance with an embodiment of the present disclosure. The illustrated example power converter 100 includes an energy transfer element T1 106, an input winding 108 of the energy transfer element T1 106, an output winding 110 of the energy transfer element T1 106, a power switch S1 112, an input return 111, a clamp circuit 114, an output rectifier S2 114, an output capacitor CO 115, an output return 118, a feedback sense circuit 120, a second controller 122, and a first controller 121. The second controller 122 is shown as including a synchronous rectifier (SR) control and request circuit 132, a measurement enable circuit 138, a discontinuous conduction mode (DCM) sense circuit 145, extremum locator switching window generator 146 and comparators 133, 139, and 147. A communication link 199 between the second controller 122 and first controller 121 is also shown.

Further shown in FIG. 1 are an input voltage $V_{IN}$ 102, an output voltage Vo 116, an output current $I_O$ 117, a winding signal FWD 123, a feedback signal FB 124, an output voltage signal VOUT 116, a request signal REQ 127, a current sense signal ISNS 129, a switch current $I_D$ 130, a power switch voltage $V_D$ 150, a primary drive signal DR 131. The example shown can also include a clamp drive signal CD 184 if the clamp circuit 114 is an active clamp circuit with a clamp switch. FIG. 1 further illustrates a regulation reference REF 134, a secondary control signal SEC_CTRL 135, a quiet signal QUIET 136, a switching window signal SW 136 a percentage of the regulation reference X % REF 140, an synchronous on signal SR_ON 141, a DCM signal 142, a complete signal CMPL 143, an enable signal EN 144, and a trim signal QRZV 148. In the illustrated example, the power converter 100 is shown as having a flyback topology. Further, the input of power converter 100 is galvanically isolated from the output of power converter 100, such that input return 111 is galvanically isolated from output return 118. Since the input and output of power converter 100 are galvanically isolated, there is no direct current (dc) path across the isolation barrier of energy transfer element T1 106, or between input winding 108 and output winding 110, or between input return 111 and output return 118. It is appreciated that other known topologies and configurations of power converters may also benefit from the teachings of the present disclosure.

The power converter 100 provides output power to a load 119 from an unregulated input $V_{IN}$ 102. In one embodiment, the input $V_{IN}$ 102 is a rectified and filtered ac line voltage. In another embodiment, the input voltage $V_{IN}$ 102 is a dc input voltage. The input $V_{IN}$ 102 is coupled to the energy transfer element 106. In some embodiments, the energy transfer element 106 may be a coupled inductor, transformer, or an inductor. The example energy transfer element 106 is shown as including two windings, an input winding 108 (also referred to as a primary winding) and an output winding 110 (also referred to as a secondary winding). However, the energy transfer element 106 may have more than two windings. The input winding 108 of the energy transfer element is further coupled to the power switch S1 112 and the power switch S1 112 is further coupled to input return 111. The voltage at the drain of the power switched S1 112 is denoted as power switch voltage $V_D$ 150. Coupled across the input winding 108 is the clamp circuit 114. The clamp circuit 114 limits the maximum voltage on the power switch S1 112. Further, when the clamp circuit 114 includes active circuit components, such as a switch, the clamp circuit 114 may facilitate zero voltage switching of the power switch S1 112 (e.g., ZV control mode of the first controller 121 and second controller 122).

Output winding 110 is coupled to the output rectifier S2 114, which is exemplified as a transistor used as a synchronous rectifier. However, the output rectifier S2 114 may be a diode. Output capacitor CO 115 is shown as being coupled to the output rectifier S2 114 and the output return 118. The power converter 100 further includes circuitry to regulate the output, which in one example may be the output voltage $V_{OUT}$ 116, output current $I_O$ 117, or a combination of the two. A feedback sense circuit 120 is coupled across the output capacitor CO 115 to provide the feedback signal FB 124, representative of the output of the power converter 100, to the second controller 122. For the example shown, the feedback signal FB 124 is a scaled version of the output voltage VO 116. The second controller 122 is further coupled to the output capacitor CO 115 to receive the output voltage VOUT 116 and the second controller 122 is coupled to the output winding 110 to receive the winding signal FWD 123. The winding signal FWD 123 is representative of the voltage at one end of the output winding 110. For the example shown, the winding signal FWD 123 is representative of the voltage at the non-dotted end of output winding 110 and the drain voltage of the output rectifier S2 114, illustrated as a transistor utilized as a synchronous output rectifier.

The second controller 122 includes an SR control and request circuit 132 and comparator 133. Comparator 133 is coupled to receive the feedback signal FB 124 and the regulation reference REF 134. In particular, comparator 133 is coupled to receive the feedback signal FB 124 at its inverting input and the regulation reference REF 134 at its non-inverting input. The SR control and request circuit 132 is configured to receive the output of comparator 133, the winding signal FWD 123, and the switching window signal SW 137. In response to the comparison of the feedback signal FB 124 to the regulation reference REF 134 and the winding signal FWD 123, the SR control and request circuit 132 outputs the secondary drive signal SR 126 and the request signal REQ 127. The secondary drive signal SR 126 is received by the output rectifier S2 114 and controls the turn on and turn off of the output rectifier S2 114. The request signal REQ 127 is representative of a request to turn on the power switch S1 112. The request signal REQ 127 may include request events 128 which are generated in response to the comparison of the feedback signal FB 124 to the regulation reference REF 134. The request signal REQ 127 may be a rectangular pulse waveform which pulses to a logic high value and quickly returns to a logic low value. The logic high pulses may be referred to as request events 128. The SR control and request circuit 132 also receives the switching window signal SW 137. As will be further discussed, the switching window signal SW 137 is representative of the timing in which the SR control and request circuit 132 may output request events 128 in the request signal REQ 127. In embodiments, the switching window signal SW 137 includes switching windows in which the SR control and request circuit 132 may output request events 128. Further, when the second controller is operating in DCM, the switching windows in the switching window signal SW 137 may correspond with extremums in the winding signal FWD 123. By synchronizing the timing of the request events 128 with extremums in the winding signal FWD 123, the power converter 100 may operate in either quasi-resonant or zero-voltage control to minimize switching losses.

The first controller 121 is coupled to receive a current sense signal ISNS 129 representative of the switch current $I_D$ 130 of the power switch S1 112 and the request signal REQ 127 through a communication link 199, shown as a dashed line, and outputs the primary drive signal D1 134. The first controller 121 provides the primary drive signal DR 131 to the power switch S1 112 to control various switching parameters of the power switch S1 112 to control the transfer of energy from the input of to the output of the power converter 100 through the energy transfer element 106. Example of such parameters include switching frequency (or switching period), duty cycle, on-time and off-times, or varying the number of pulses per unit time of the power switch S1 112. In addition, the power switch S1 112 may be controlled such that it has a fixed switching frequency or a variable switching frequency. In one example of variable switching frequency control, the switching frequency may be reduced for light-load or no-load conditions. In one embodiment, the primary drive signal DR 131 is a rectangular pulse waveform with varying durations of logic high and logic low sections, logic high sections corresponding to the power switch S1 112 being ON and logic low sections corresponding to the power switch S1 112 being OFF. In one embodiment, the first controller 121 outputs the primary drive signal DR 131 to turn ON the power switch S1 112 in response to a request event 128 in the request signal REQ 127. The first controller 121 outputs the primary drive signal DR 131 to turn OFF the power switch S1 112 when the switch current $I_D$ 130 provided by the current sense signal ISNS 129 reaches a current limit.

If the clamp circuit 114 includes active components, such as a transistor, the first controller 121 may also output a clamp drive signal CD 184. The clamp drive signal CD 184 controls various switching parameters of the clamp switch, such as the on-times or off-times of the clamp switch. In one embodiment, the clamp drive signal CD 184 is a rectangular pulse waveform with varying durations of logic high and logic low sections, logic high sections corresponding to the clamp switch being ON and logic low sections corresponding to the clamp switch being OFF. In one example, in response to a request event 128 in the request signal REQ 127, the first controller outputs the clamp drive signal CD 184 to turn ON the clamp switch for a duration which may be selected such that sufficient charge is provided from the clamp circuit 114 to the input winding 108, which will be used to discharge the parasitic capacitance of the power switch S1 112. In one embodiment, once the clamp drive signal CD 84 turns OFF the clamp switch of the clamp circuit 114, the first controller 121 outputs the primary drive signal DR 131 to turn ON the power switch S1 112. The first controller 121 outputs the primary drive signal DR 131 to turn OFF the power switch S1 112 when the switch current $I_D$ 130 provided by the current sense signal ISNS 129 reaches a current limit.

The second controller 122 and the first controller 121 may communicate via the communication link 199. For the example shown, the second controller 122 is coupled to the secondary side of the power converter 100 and is referenced to the output return 118 while the first controller 121 is coupled to the primary side of the power converter 100 and is referenced to the input return 111. In embodiments, the first controller 121 and the second controller 122 are galvanically isolated from one another and the communication link 199 provides galvanic isolation using an inductive coupling, such as a transformer or a coupled inductor, an optocoupler, capacitive coupling, or other device that maintains the isolation. However, it should be appreciated that in some embodiments, the second controller 122 is not galvanically isolated from the first controller 121.

In one example, the first controller 121 and second controller 122 may be formed as part of an integrated circuit that is manufactured as either a hybrid or monolithic integrated circuit. In one example, the power switch S1 112 may also be integrated in a single integrated circuit package with the first controller 121 and the second controller 122. In addition, in one example, first controller 121 and second controller 122 may be formed as separate integrated circuits. The power switch S1 112 may also be integrated in the same integrated circuit as the first controller 121 or could be formed on its own integrated circuit. Further, it should be appreciated that both the first controller 121, the second controller 122 and power switch S1 112 need not be included in a single package and may be implemented in separate controller packages or a combination of combined/separate packages.

It is generally understood that a switch that is closed may conduct current and is considered on, while a switch that is open cannot conduct current and is considered off. In one example, the power switch S1 112 may be a transistor such as a metal-oxide-semiconductor field-effect transistor (MOSFET), bipolar junction transistor (BJT), silicon carbide (SiC) based transistor, gallium nitride (GaN) based transistor, or an insulated-gate bipolar transistor (IGBT).

The second controller 122 further includes measurement enable circuit 138, comparator 139, DCM sense circuit 145, extremum locator switching window generator 146, and comparator 147. As shown, comparator 139 is configured to receive the feedback signal FB 124 and a percentage of the regulation reference X % REF 140. In one example the percentage of the regulation reference X % REF 140 is substantially 90% of the regulation reference REF 134. In particular, comparator 139 is coupled to receive the feedback signal FB 124 at its non-inverting input and percentage of the regulation reference X % REF 140 at its inverting input. The output of comparator 139 is received by the measurement enable circuit 138. The measurement enable circuit 138 is also configured to receive a synchronous on signal SR_ON 141, representative of a turn ON off the output rectifier S2 114.

During start-up of the power converter 100, the first controller 121 is generally in control of regulation of the output until the second controller 122 is ready to take control. Once the second controller 122 is ready to take control of regulation, the SR control and request circuit 132 outputs the secondary control signal SEC_CTRL 135, representative of the second controller 122 having control of regulation of the output, to the measurement enable circuit 138. In another embodiment, the SR control and request circuit 132 may also output the secondary control signal SEC_CTRL 135 to the extremum locator switching window generator 146. The secondary control signal SEC_CTRL 135 to the extremum locator switching window generator 146 is shown as a dashed line to illustrate that this may be optional and/or another embodiment. In one example, the SR control and request circuit 132 determines that the second controller 122 may take control of the output regulation to load 119 by monitoring the winding signal FWD 123.

Further, the measurement enable circuit 138 receives a DCM sense signal 142, representative of the power converter 100 operating in DCM, from the DCM sense circuit 145. In one example, the DCM sense circuit 145 receives the winding signal FWD 123 and determines if the power converter 100 is operating in DCM or continuous conduction mode (CCM). In one example, the winding signal FWD 123 is compared to a threshold to determine if the power converter 100 is operating in DCM or CCM. For example, if the winding signal FWD 123 is less than the output return 118, this may indicate operation in CCM. The DCM sense signal 142 is provided to the measurement enable circuit 138 and the extremum locator switching window generator 146. In one example, the DCM sense signal 142 may be a rectangular pulse waveform of varying lengths of logic high and logic low value. In one embodiment, the DCM sense signal 142 may pulse to a logic high value when the power converter 100 begins operating in DCM. In another embodiment, the DCM sense signal 142 may be logic high when operating in CCM and a trailing edge in the DCM sense signal 142 indicates that the power converter 100 has begun operating in DCM.

The measurement enable circuit 138 is also configured to output an enable signal EN 144 and a quiet signal 136 to the extremum locator switching window generator 146. Alternatively, the measurement enable circuit 138 may output the quiet signal 136 to the SR control and request circuit 132. The enable signal EN 144 is representative of enabling measurement of a half cycle of the relaxation ring of the winding signal FWD 123. In one embodiment, the extremum locator switching window generator 146 outputs a complete signal CMPL 143, representative of the measurement of the half cycle of the relaxation ring of the winding signal FWD 123 for the half cycle reference being complete, to the measurement enable circuit 138. As shown, the complete signal CMPL 143 to the measurement enable circuit 138 is shown in a dashed line to illustrate that this may be optional or another embodiment. The quiet signal 136 is representative of a quiet duration in which request events 128 are prevented from being transmitted to the first controller 121 via the request signal REQ 127.

In operation, the measurement enable circuit 138 is in an idle state until the secondary control signal SEC_CTRL 135 indicates that the second controller 122 has taken control of regulating the output of the power converter 100. Once the secondary control signal SEC_CTRL 135 indicates that the second controller 122 has taken control of regulating the output (e.g., the secondary control signal SEC_CTRL 135 has been asserted), the measurement enable circuit 138 is a monitoring state in which the measurement enable circuit 138 monitors the comparison between the feedback signal FB 124 and the percentage of the regulation reference X % REF 140 and the synchronous on signal SR_ON 141. In one embodiment, the enable signal EN 144 is asserted in response to the comparison between the feedback signal FB 124 and the percentage of the regulation reference X % REF 140 and the synchronous on signal SR_ON 141. For example, the enable signal EN 144 is asserted when the feedback signal FB 124 is greater than the percentage of the regulation reference X % REF 140. However, the assertion of the enable signal EN 144 is synchronized with the synchronous on signal SR_ON 141. In one example, the synchronous on signal SR_ON 141 is a rectangular pulse waveform which quickly pulses to a logic high value then falls to a logic low value when the output rectifier S2 114 turns ON. If the feedback signal FB 124 is greater than the percentage of the regulation reference X % REF 140 prior to the synchronous on signal SR_ON 141 indicating that the output rectifier S2 114 has turned ON, the enable signal EN 144 is asserted when the turn on of the output rectifier S2 114 during the current switching cycle. If the feedback signal FB 124 is greater than the percentage of the regulation reference X % REF 140 after the synchronous on signal SR_ON 141 indicates that the output rectifier S2 114 has turned ON, the enable signal EN 144 is not asserted until the next switching cycle in which the output rectifier S2 114 turns ON. Once the enable signal EN 144 is asserted, the quiet signal 136 is asserted to prevent request events 128 from being sent to the first controller 121.

The measurement enable circuit 138 is in an enabled measurement state once the enable signal EN 144 is asserted. During at least a portion of this state, both the enable signal EN 144 and the quiet signal 136 are asserted. Once the DCM signal 142 indicates that the power converter 100 is operating in DCM, a first duration is added to the current duration of the quiet signal 136. In one embodiment, a monostable multivibrator (also referred to as a one-shot) is triggered by the DCM signal 142 indicating that the power converter 100 is operating in DCM to add the first duration. The quiet signal 136 is deasserted when the first duration ends. In one example, the first duration is selected to be long enough for one or two full cycles of the relaxation ring of the winding signal FWD 123 to occur. In one example, the first duration is substantially 10 μs. In another example, the first duration is within the range of 10 to 20 μs. In one embodiment, if the enable signal EN 144 is deasserted prior to the first duration ending, the quiet signal 136 is deasserted in response to the deassertion of the enable signal EN 144. In one embodiment, the enable signal EN 144 is deasserted in response to the secondary control signal SEC_CTRL 135 being deasserted. The measurement enable circuit 138 returns to the idle state when the secondary control signal SEC_CTRL 135 indicates that the second controller 122 no longer has control of the output regulation (e.g., the secondary control signal SEC_CTRL 135 is deasserted). Once the measurement enable circuit 138 returns to the idle state, the enable signal EN 144 is deasserted.

In another embodiment in which the measurement enable circuit 138 receives the complete signal CMPL 143, the measurement enable circuit 138 may dessert the enable signal EN when the complete signal CMPL 143 indicates that the half cycle measurement of the winding signal FWD 123 for the half cycle reference which generates the switching windows in the switching window signal SW 137 has been completed by the extremum locator switching window generator 146. As will be further discussed for this embodiment, the extremum locator switching window generator 146 utilizes the secondary control signal SEC_CTRL 135 to return to an idle state of the extremum locator switching window generator 146.

Extremum locator switching window generator 146 is coupled to receive the quiet signal 136, the DCM signal 142, enable signal EN 144, the output of comparator 147, and a trim signal QRZV 148. Optionally and/or in one embodiment, the extremum locator switching window generator 146 may also receive the secondary control signal SEC_CTRL 135, as shown by the dashed line. Comparator 147 is coupled to receive the winding signal FWD 123 and the output voltage VOUT 116. As shown, the winding signal FWD 123 is received at the non-inverting input while the output voltage VOUT 116 is received at the inverting input of comparator 147. The extremum locator switching window generator 146 outputs the switching signal SW 137, which is representative of when the second controller 122 may output request events 128 in the request signal REQ 127. In one example, the switching signal SW 137 may be a rectangular pulse waveform with varying durations of logic high and logic low sections. Logic high sections may correspond to a switching window in which the SR control and request circuit 132 may output request events 128 in the request signal REQ 127. Logic low sections may correspond to windows of "no switching" in which the SR control and request circuit 132 is prevented from outputting request events 128 in the request signal REQ 127.

When the power converter 100 is operating in DCM, the extremum locator switching window generator 146 outputs switching windows in the switching signal SW 137 which corresponds to extremums in the relaxation ring of the winding signal FWD 123. The trim signal QRZV 148 is representative of the trim option between QR control mode and ZV control mode. As mentioned above, in ZV mode, switching losses may be minimized by sending request events 128 near the valley of the winding signal FWD 123 relaxation ring. In QR mode, switching losses may be minimized by sending request events 128 near the peak of the winding signal FWD 123 relaxation ring. As such, when the trim signal QRZV 148 indicates that the second controller 122 is operating in QR mode, the extremum locator switching window generator 146 outputs switching windows in the switching signal SW 137 which corresponds to peaks in the relaxation ring of the winding signal FWD 123. When the trim signal QRZV 148 indicates that the second controller 122 is operating in ZV mode, the extremum locator switching window generator 146 outputs switching windows in the switching signal SW 137 which corresponds to valleys in the relaxation ring of the winding signal FWD 123.

In embodiments, the extremum locator switching window generator 146 determines the extremum of the winding signal FWD 123 by measuring the half cycle of the relaxation ring of the winding signal FWD 123. Once the half cycle of the relaxation ring is measured, the extremum locator switching window generator 146 determines a half cycle reference which is utilized to output the switching windows in the switching window signal SW 137.

In operation, the extremum locator switching window generator 146 is in an idle state when the enable signal EN 144 is not asserted. The extremum locator switching window generator 146 transitions to a measurement state once the enable signal EN 144 is asserted. When the enable signal EN 144 is asserted, the extremum locator switching window generator 146 measures the half line cycle from the comparison of the winding signal FWD 123 to the output voltage VOUT 116 (e.g. the output of comparator 147). The extremum locator switching window generator 146 begins the measurement of the half line cycle once the DCM signal 142 indicates that the power converter 100 is operating in DCM. Once measurement of the half line cycle has been completed, the extremum locator switching window generator 146 stores the measured half line cycle and converts it to a half cycle reference. The half cycle reference is utilized to generate the switching windows of the switching window signal SW 137. In addition, the complete signal CMPL 143 indicates that the measurement of the half cycle for the half cycle reference has been completed.

If the trim signal QRZV 148 indicates QR control mode, the extremum locator switching window generator 146 measures the half line cycle once when the winding signal FWD 123 is greater than the output voltage VOUT 116 after the DCM sense signal 142 indicates the power converter 100 is operating in DCM. Further, the complete signal CMPL 143 indicates that the measurement has been completed when the winding signal FWD 123 has crossed the output voltage VOUT 116 twice after the DCM sense signal 142 indicates the power converter 100 is operating in DCM.

If the trim signal QRZV 148 indicates ZV control mode, the extremum locator switching window generator 146 measures the half line cycle once when the winding signal FWD 123 is less than the output voltage VOUT 116 after the DCM sense signal 142 indicates the power converter 100 is operating in DCM. Further, the complete signal CMPL 143 indicates that the measurement has been completed when the winding signal FWD 123 has crossed the output voltage VOUT 116 three times after the DCM sense signal 142 indicates the power converter 100 is operating in DCM.

Once the complete signal CMPL 143 indicates that the measurement has been completed (e.g. the complete signal CMPL 143 is asserted), the extremum locator switching window generator 146 is in a window generation state in which the winding signal FWD 123 is compared to the output voltage VOUT 116 to determine the half cycle for every switching cycle of the power converter 100. The half cycle and the half cycle reference are utilized to determine the switching windows of the switching window signal SW 137. The extremum locator switching window generator 146 returns to the idle state when the enable signal EN 144 is deasserted or the secondary control signal SEC_CTRL 135 is deasserted. As mentioned above, in one embodiment, the enable signal EN 144 is deasserted in response to the deassertion of the secondary control signal SEC_CTRL 135. As such, the extremum locator switching window generator 146 returns to the idle state in response to either the enable signal EN 144, which is responsive to the secondary control signal SEC_CTRL 135. However, in another embodiment the enable signal EN 144 may be deasserted when the complete signal CMPL 143 is asserted. For that embodiment, the extremum locator switching window generator 146 returns to the idle state in response to the secondary control signal SEC_CTRL 135. As such, the first controller 121 and second controller 122 may minimize switching losses by sending request events 128 in the request signal REQ 127 corresponding to extremums in the winding signal FWD 123 when the power converter 100 is operating in DCM.

Figure 2A:
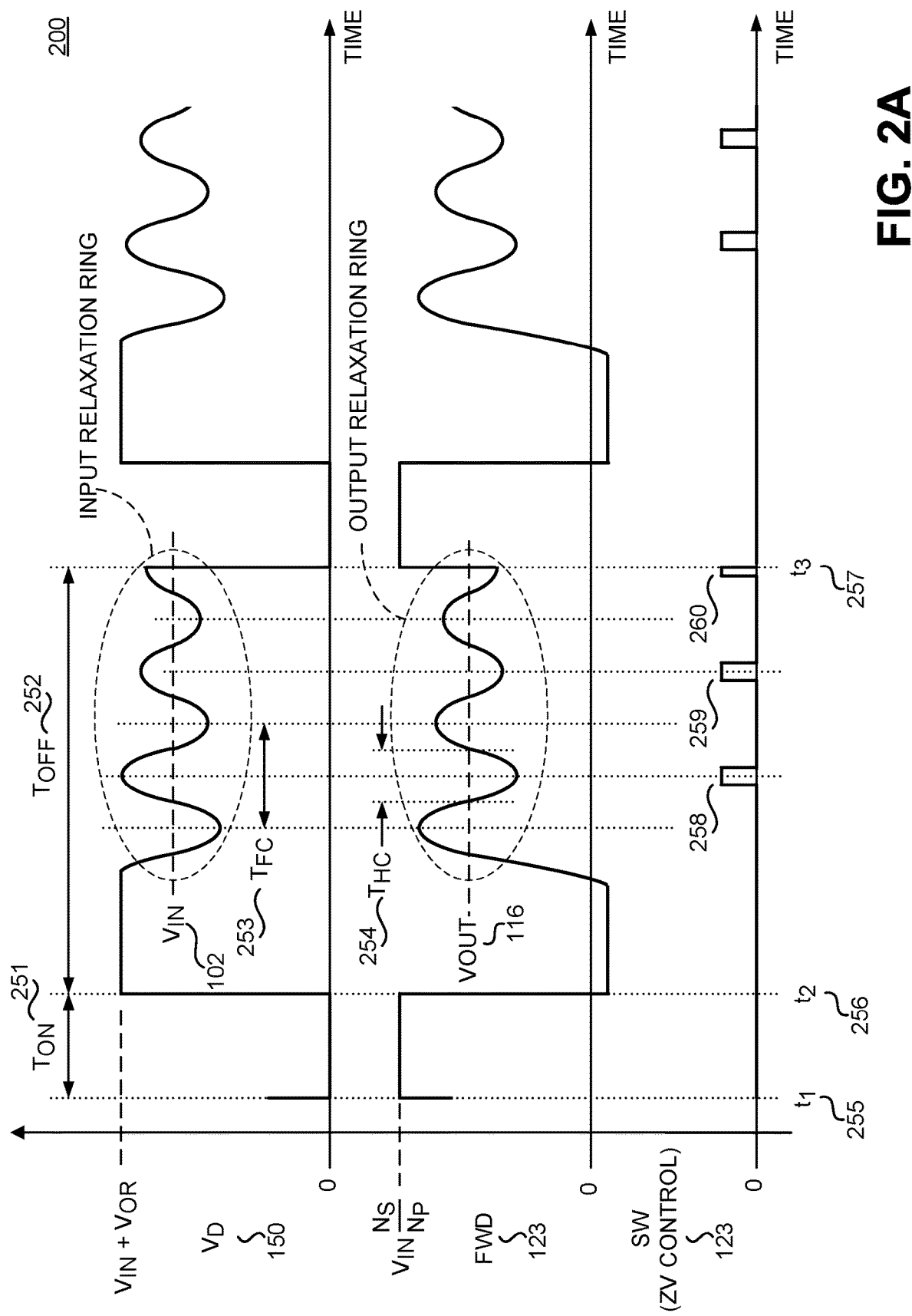
FIG. 2A is a timing diagram illustrating example waveforms of the power switch voltage, winding signal, and switching signal of FIG. 1 when the first and second controller are operating in zero-voltage control, in accordance with an embodiment of the present disclosure.

FIG. 2A illustrates timing diagram 200 with example waveforms of the power switch voltage $V_D$ 150, winding signal FWD 123, and switching signal SW 137 when the trim signal QRZV 148 indicates that the first controller 121 and second controller 122 are operating in zero-voltage (ZV) control and the power converter 100 is operating in discontinuous conduction mode (DCM).

Between times $t_1$ 255 and $t_2$ 256, the power switch S1 112 is ON and the duration of time is denoted as the on-time $T_{ON}$ 251 of power switch S1 112. During the on-time $T_{ON}$ 251, the power switch voltage $V_D$ 150 is substantially zero. Further, the output rectifier S2 114 blocks current to the output of the power converter 100 and as such the voltage of the winding signal FWD 123 is substantially the input voltage $V_{IN}$ 102 times the turns ratio of the energy transfer element T1 106, or mathematically:

$$V_{FWD}(T_{ON}) = V_{IN} \frac{N_S}{N_P}.$$

At time $t_2$ 256, the power switch S1 112 is turned OFF and the off-time $T_{OFF}$ 252 of power switch S1 112 begins. At the beginning of the off-time $T_{OFF}$ 252 while the body diode of the output rectifier S2 114 is conducting due to the energy transfer element T1 106 transferring energy between the input and the output of the power converter 100, the power switch voltage $V_D$ 150 increases and is substantially equal to the sum of the input voltage $V_{IN}$ 102 and the reflected output voltage $V_{OR}$. While the body diode of the output rectifier S2 114 is conducting, the voltage of the winding signal FWD 123 decreases to a value below zero due to the voltage drop across the body diode of the output rectifier S2 114. Once the transfer of energy is complete, the body diode of the output rectifier S2 114 stops conducting and the relaxation ring occurs for both the power switch voltage $V_D$ 150 and the voltage of the winding signal FWD 123. Due to the polarity of the transformer, the polarity of the power switch voltage $V_D$ 150 and the voltage of the winding signal FWD 123 are opposite of each other. As shown, a peak in the relaxation ring of the power switch voltage $V_D$ 150 corresponds to a valley in the relaxation ring of the winding signal FWD 123. The relaxation ring for the power switch voltage $V_D$ 150 generally oscillates around the input voltage $V_{IN}$ 102 while the relaxation ring for the winding signal FWD 123 generally oscillates around the output voltage VOUT 116. Further, as shown, a full cycle $T_{FC}$ 253 of the relaxation ring may be measured from a peak to peak (or valley to valley) of either the power switch voltage $V_D$ 150 or the winding signal FWD 123. Alternatively, a full cycle $T_{FC}$ 253 of the relaxation ring may be as the duration between three crossings of the power switch voltage $V_D$ 150 with the input voltage $V_{IN}$ 102 or the duration between three crossings of the winding signal FWD 123 with the output voltage VOUT 116. The half cycle THC 254 may be measured as the duration between consecutive crossings of the winding signal FWD 123 with the output voltage VOUT 116, which correspond with consecutive crossings of the power switch voltage $V_D$ 150 with the input voltage $V_{IN}$ 102. For a first controller 121 and second controller 122 operating in ZV control mode, the half cycle THC 254 may be measured as the duration with the winding signal FWD 123 falls below the output voltage VOUT 116 and then rises above the output voltage VOUT 116. As such, the extremum locator switching window generator 146 may determine the approximate location of the valley of the relaxation ring of the winding signal FWD 123.

In response to the comparison between the winding signal FWD 123 and the output voltage VOUT 116, the extremum locator switching window generator 146 measures the half cycle THC 254 and determines the switching windows 258, 259, 260 of the switching window signal SW 137. The switching windows correlate with an extremum in the relaxation ring of the winding signal FWD 123. For a first controller 121 and second controller 122 operating in ZV control mode, the switching windows 258, 259, 260 correlate with valleys in the relaxation ring of the winding signal FWD 123. In one embodiment, when the switching window signal SW 137 is logic low, the second controller 122 is prevented from sending request events 128 in the request signal REQ 127. The logic high sections correspond to the switching windows 258, 259, 260. When the switching window signal SW 137 is logic high, the second controller 122 may send a request event 128 in the request signal REQ 127. At time $t_3$ 257, a request event 128 is sent from the second controller 122 to the first controller 121. For ZV control mode and the power converter 100 includes a clamp circuit 114 with active components, when the first controller 121 outputs a clamp drive signal CD 184 in response to a request event 128 in the request signal REQ 127 to turn on a clamp switch of the clamp circuit 114. The clamp switch is turned ON for a duration such that sufficient charge is provided from the clamp circuit 114 to the input winding 108 to discharge the parasitic capacitance of the power switch S1 112. Once the clamp drive signal CD 184 turns OFF the clamp switch of the clamp circuit 114, the first controller 121 outputs the primary drive signal DR 131 to turn ON the power switch S1 112 and the off-time $T_{OFF}$ 252 of the power switch S1 112 has ended. The duration between times $t_2$ 256 and $t_3$ 257 is shown as the off-time $T_{OFF}$ 252 of power switch S1 112, however, it should be appreciated that the delay between turning on and off the clmap switch of the clamp circuit 114 and the turn on of the power switch S1 112 is not illustrated.

Figure 2B:
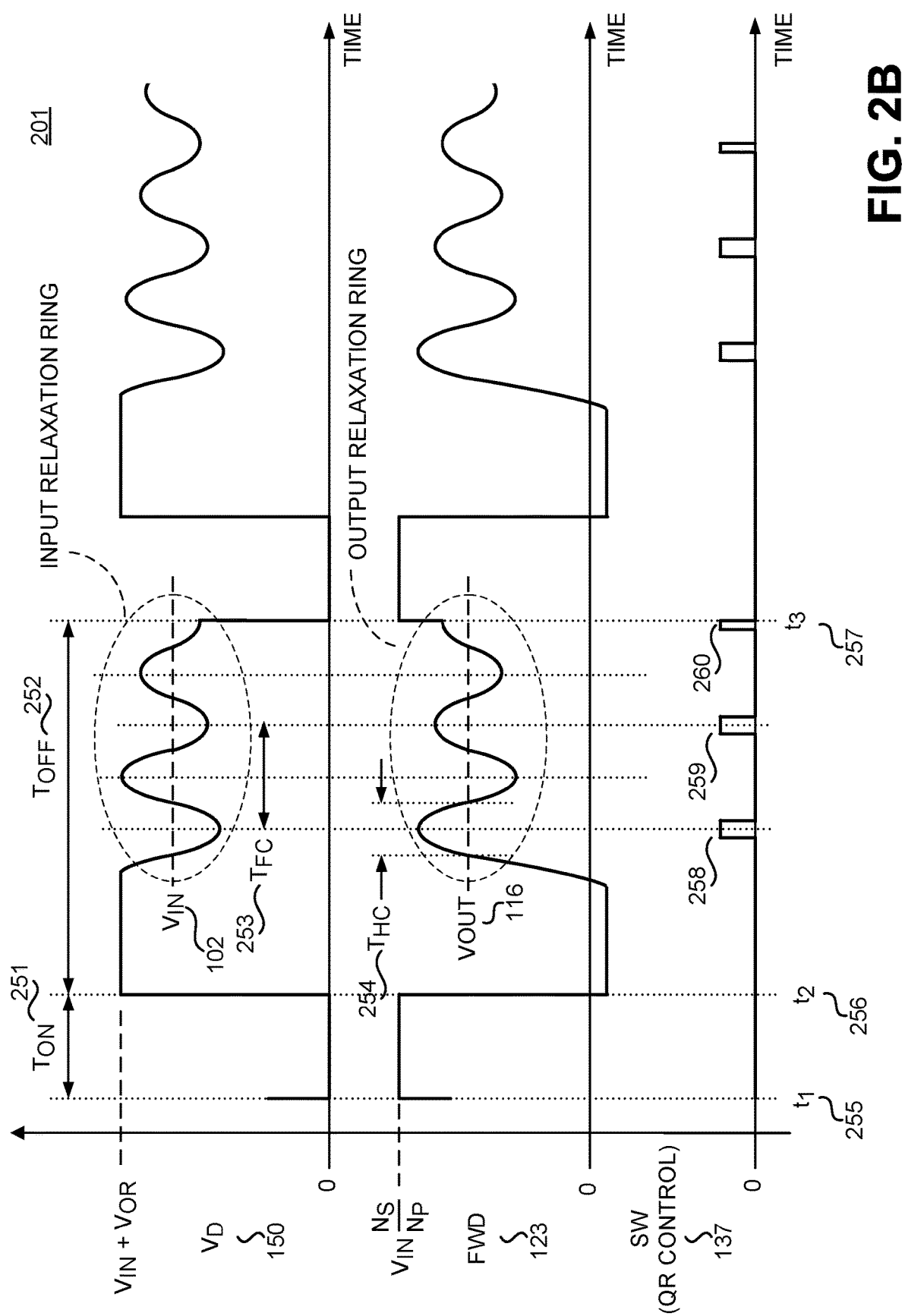
FIG. 2B is a timing diagram illustrating another example waveforms of the power switch voltage, winding signal, and switching signal of FIG. 1 when the first and second controller are operating in quasi-resonant control, in accordance with an embodiment of the present disclosure.

FIG. 2B illustrates timing diagram 201 with example waveforms of the power switch voltage $V_D$ 150, winding signal FWD 123, and switching signal SW 137 when the trim signal QRZV 148 indicates that the first controller 121 and second controller 122 are operating in quasi-resonant (QR) control and the power converter 100 is operating in DCM. It should be appreciated that the waveforms for the power switch voltage $V_D$ 150 and the voltage of winding signal FWD 123 are similar to what is shown and described with respect to FIG. 2A. At least one difference, however, is the switching windows 258, 259, and 260 correlate with peaks of the relaxation ring of the winding signal FWD 123 when the first controller 121 and second controller 122 are operating in QR control mode.

The half cycle THC 254 may be measured as the duration between consecutive crossings of the winding signal FWD 123 with the output voltage VOUT 116, which correspond with consecutive crossings of the power switch voltage $V_D$ 150 with the input voltage $V_{IN}$ 102. For a first controller 121 and second controller 122 operating in QR control mode, the half cycle THC 254 may be measured as the duration with the winding signal FWD 123 increase above the output voltage VOUT 116 and then falls below the output voltage VOUT 116. As such, the extremum locator switching window generator 146 may determine the approximate location of the peak of the relaxation ring of the winding signal FWD 123.

In response to the comparison between the winding signal FWD 123 and the output voltage VOUT 116, the extremum locator switching window generator 146 measures the half cycle THC 254 and determines the switching windows 258, 259, 260 of the switching window signal SW 137. The switching windows correlate with an extremum in the relaxation ring of the winding signal FWD 123. For a first controller 121 and second controller 122 operating in QR control mode, the switching windows 258, 259, 260 correlate with peaks in the relaxation ring of the winding signal FWD 123. In one embodiment, when the switching window signal SW 137 is logic low, the second controller 122 is prevented from sending request events 128 in the request signal REQ 127. The logic high sections correspond to the switching windows 258, 259, 260. When the switching window signal SW 137 is logic high, the second controller 122 may send a request event 128 in the request signal REQ 127. At time $t_3$ 257, a request event 128 is sent from the second controller 122 to the first controller 121. When operating in QR control mode, the first controller 121 outputs the primary drive signal DR 131 to turn ON the power switch S1 112 in response to a request event 128. At time $t_3$ 257, the off-time $T_{OFF}$ 252 of the power switch S1 112 has ended.

Figure 3A:
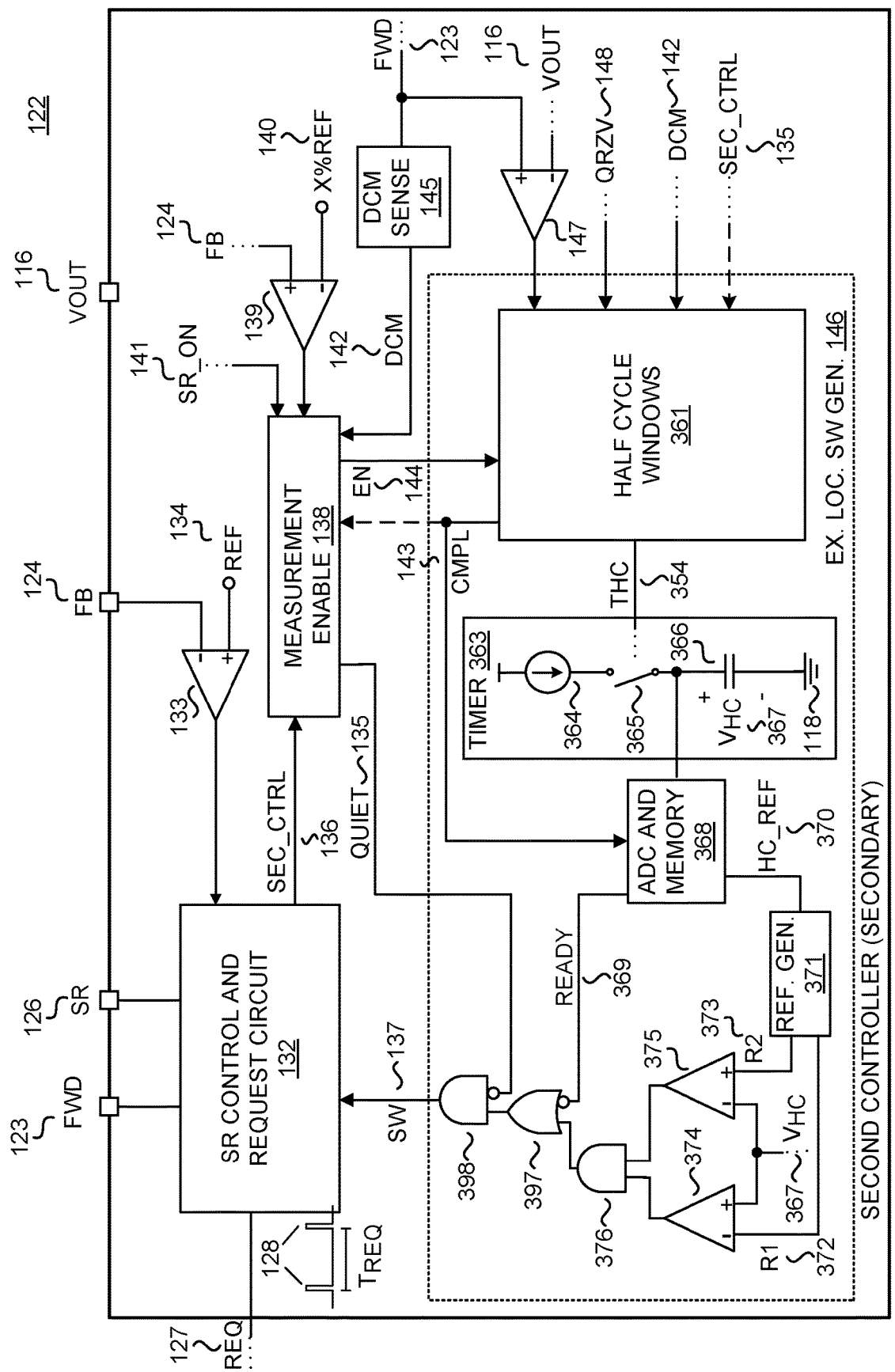
FIG. 3A is a diagram illustrating an example second controller of FIG. 1 including the extremum locator switching window generator and measurement enable circuit, in accordance with an embodiment of the present disclosure.

FIG. 3A illustrates the second controller 122 including the SR control and request circuit 132, comparator 133, measurement enable circuit 138, comparator 139, DCM sense circuit 145, extremum locator switching window generator 146, and comparator 147. It should be appreciated that similarly named and numbered elements couple and function as described above.

As mentioned above, comparator 133 is coupled to receive the feedback signal FB 124 and the regulation reference REF 134. In particular, comparator 133 is coupled to receive the feedback signal FB 124 at its inverting input and the regulation reference REF 134 at its non-inverting input. The SR control and request circuit 132 is configured to receive the output of comparator 133, the winding signal FWD 123, and the switching window signal SW 137. In response to the comparison of the feedback signal FB 124 to the regulation reference REF 134 and the winding signal FWD 123, the SR control and request circuit 132 outputs the secondary drive signal SR 126 and the request signal REQ 127. The secondary drive signal SR 126 is received by the output rectifier S2 114 and controls the turn on and turn off of the output rectifier S2 114. The request signal REQ 127 is representative of a request to turn on the power switch S1 112 and includes request events 128 which are generated in response to the comparison of the feedback signal FB 124 to the regulation reference REF 134. The SR control and request circuit 132 also receives the switching window signal SW 137. As will be further discussed, the switching window signal SW 137 is representative of the timing in which the SR control and request circuit 132 may output request events 128 in the request signal REQ 127. In embodiments, the switching window signal SW 137 includes switching windows in which the SR control and request circuit 132 may output request events 128.

As discussed above and illustrated in FIGS. 2A and 2B, the switching window signal SW 137 may be a rectangular pulse waveform with varying durations of logic high and logic low sections. Logic high sections may be referred to as a "switching window" and corresponds to durations of time which the SR control and request circuit 132 may output request events 128 in the request signal. In one example, when the switching window signal SW 137 is logic low, the SR control and request circuit 132 is prevented from outputting request events 128 in the request signal REQ 127. When the second controller 122 is operating in DCM, the switching windows in the switching window signal SW 137 may correspond with extremums in the winding signal FWD 123. By synchronizing the timing of the request events 128 with extremums in the winding signal FWD 123, the power converter 100 may operate in either quasi-resonant (QR) control or zero-voltage (ZV) control to minimize switching losses.

During start-up of the power converter 100, the first controller 121 is generally in control of regulation of the output until the second controller 122 is ready to take control. Once the second controller 122 is ready to take control of regulation, the SR control and request circuit 132 outputs the secondary control signal SEC_CTRL 135, representative of the second controller 122 having control of regulation of the output, to the measurement enable circuit 138. Optionally, the SR control and request circuit 132 outputs the secondary control signal SEC_CTRL 135 to the extremum locator switching window generator 146, as shown by the dashed line received by the half cycle windows circuit 361. In one example, the SR control and request circuit 132 determines that the second controller 122 may take control of the output regulation to the load 119 by monitoring the winding signal FWD 123.

Comparator 139 is configured to receive the feedback signal FB 124 and a percentage of the regulation reference X % REF 140. In one example the percentage of the regulation reference X % REF 140 is substantially 90% of the regulation reference REF 134. As shown, comparator 139 is coupled to receive the feedback signal FB 124 at its non-inverting input and percentage of the regulation reference X % REF 140 at its inverting input. The output of comparator 139 is received by the measurement enable circuit 138. The measurement enable circuit 138 is also configured to receive a synchronous on signal SR_ON 141, representative of a turn ON off the output rectifier S2 114.

Further, the measurement enable circuit 138 receives a DCM sense signal 142, representative of the power converter 100 operating in DCM, from the DCM sense circuit 145. In one example, the DCM sense circuit 145 receives the winding signal FWD 123 and determines if the power converter 100 is operating in DCM or continuous conduction mode (CCM). In one example, the winding signal FWD 123 is compared to a threshold to determine if the power converter 100 is operating in DCM or CCM. For example, if the winding signal FWD 123 is less than the output return 118, this may indicate operation in CCM. The DCM sense signal 142 is provided to the measurement enable circuit 138 and the extremum locator switching window generator 146. In one example, the DCM sense signal 142 may be a rectangular pulse waveform of varying lengths of logic high and logic low value. In one embodiment, the DCM sense signal 142 may pulse to a logic high value when the power converter 100 begins operating in DCM. In another embodiment, the DCM sense signal 142 may be logic high when the power converter 100 is operating in CCM, and a trailing edge in the DCM sense signal 142 indicates that the power converter 100 has begun operating in DCM.

The measurement enable circuit 138 is configured to output an enable signal EN 144 and a quiet signal 136 to the extremum locator switching window generator 146. Alternatively the measurement enable circuit 138 may output the quiet signal 136 to the SR control and request circuit 132. The enable signal EN 144 is representative of enabling measurement of a half cycle of the relaxation ring of the winding signal FWD 123. The quiet signal 136 is representative of a quiet duration in which request events 128 are prevented from being transmitted to the first controller 121 via the request signal REQ 127.

Figure 3B:
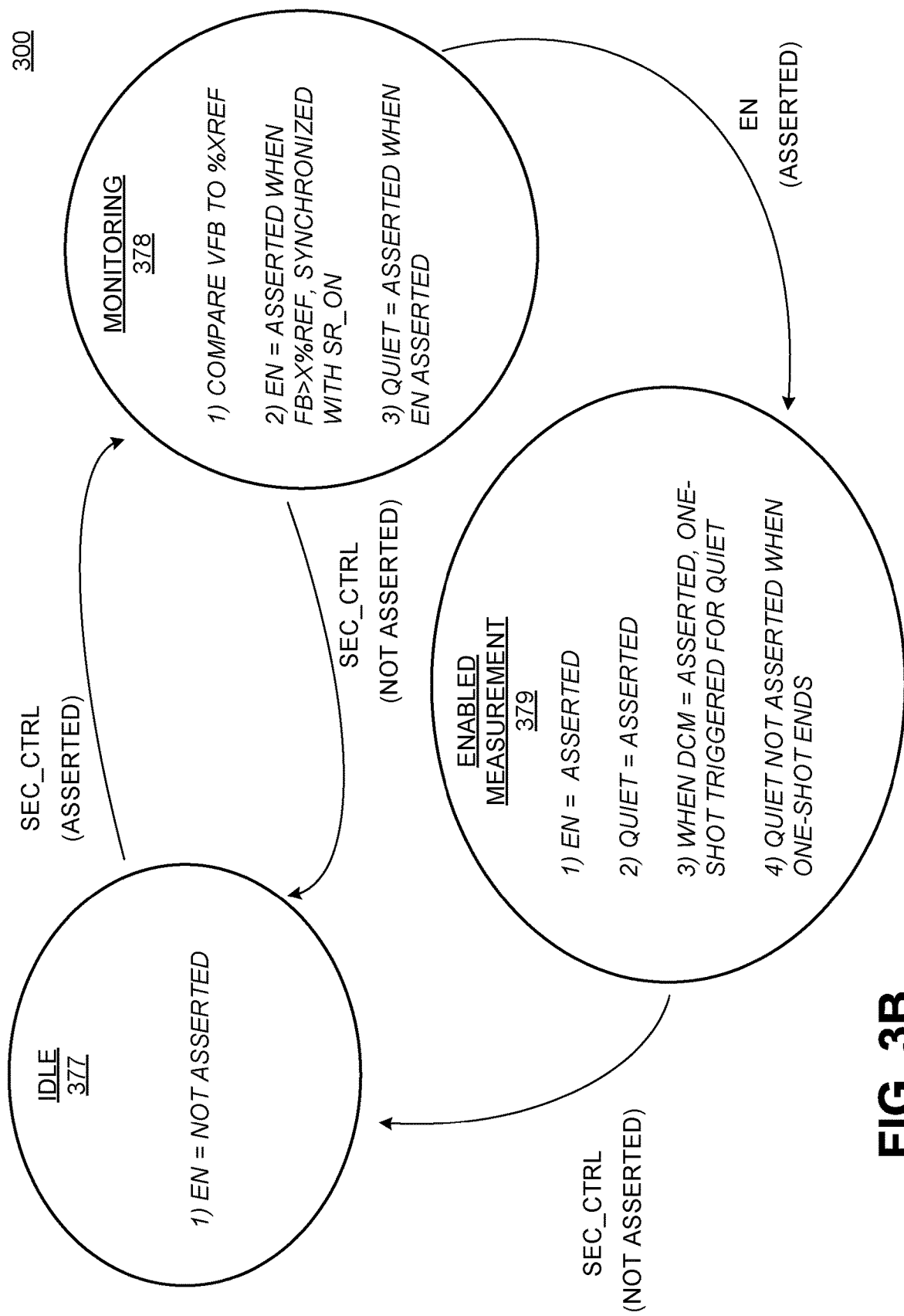
FIG. 3B is a state diagram for the measurement enable circuit of FIG. 3A, in accordance with an embodiment of the present disclosure.
Figure 4A:
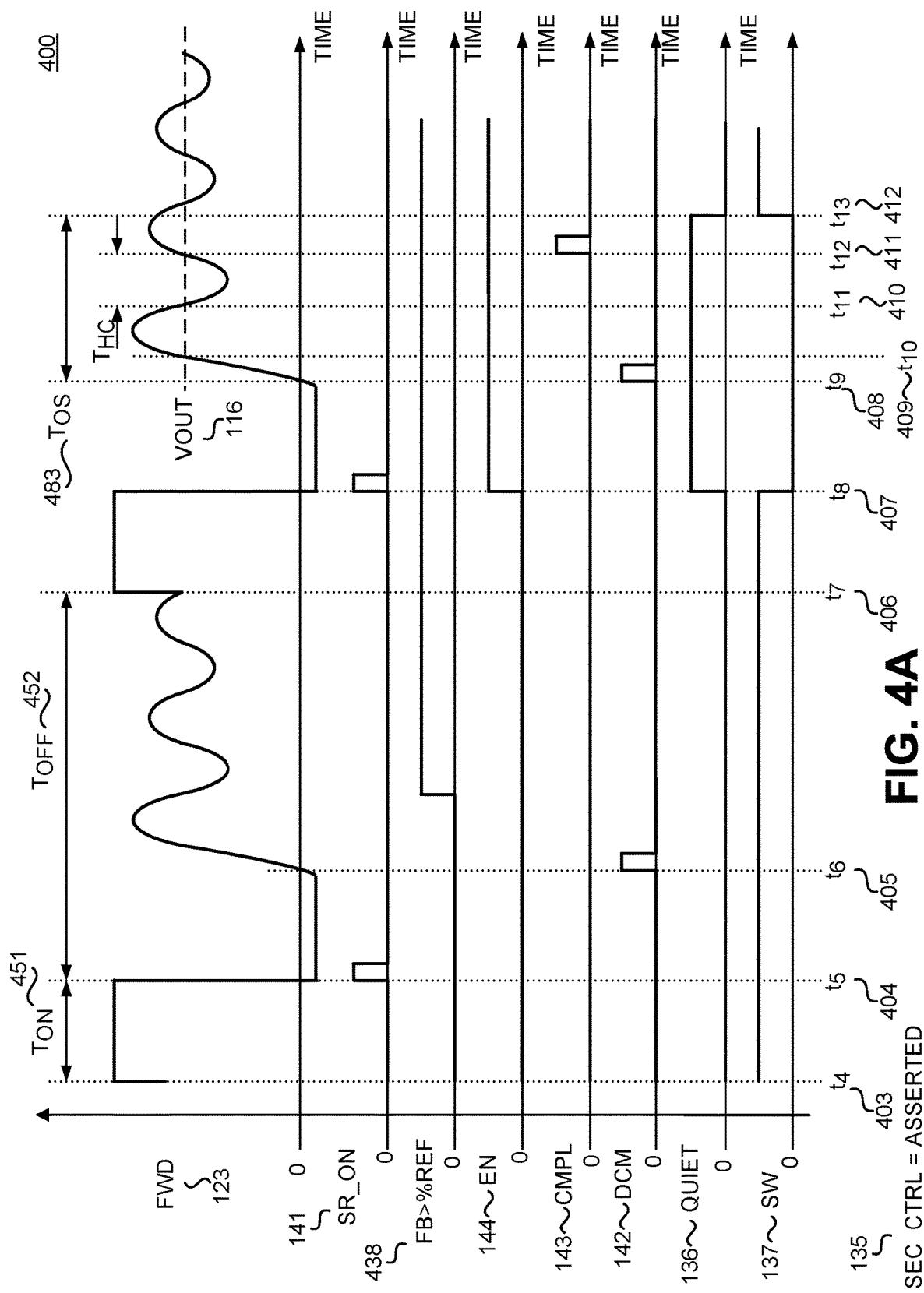
FIG. 4A is a timing diagram illustrating various waveforms for the second controller of FIG. 3A including the extremum locator switching window generator and measurement enable circuit corresponding with the measurement enable circuit enabling the extremum locator switching window generator, in accordance with an embodiment of the present disclosure.

FIG. 3B illustrates a state diagram 300 of the operation of the measurement enable circuit 138. With reference to FIGS. 3A and 3B, the measurement enable circuit 138 is in an idle state 377 until the secondary control signal SEC_CTRL 135 indicates that the second controller 122 has taken control of regulating the output of the power converter 100. During the idle state 377, the enable signal EN 144 is not asserted. Once the secondary control signal SEC_CTRL 135 indicates that the second controller 122 has taken control of regulating the output (e.g., the secondary control signal SEC_CTRL 135 has been asserted), the measurement enable circuit 138 transitions to monitoring state 378 in which the measurement enable circuit 138 monitors the comparison between the feedback signal FB 124 and the percentage of the regulation reference X % REF 140 and the synchronous on signal SR_ON 141. In one embodiment, the enable signal EN 144 is asserted in response to the comparison between the feedback signal FB 124 and the percentage of the regulation reference X % REF 140 and the synchronous on signal SR_ON 141. For example, the enable signal EN 144 is asserted when the feedback signal FB 124 is greater than the percentage of the regulation reference X % REF 140. However, the assertion of the enable signal EN 144 is synchronized with the synchronous on signal SR_ON 141. In one example, the synchronous on signal SR_ON 141 is a rectangular pulse waveform which quickly pulses to a logic high value then falls to a logic low value when the output rectifier S2 114 turns ON. If the feedback signal FB 124 is greater than the percentage of the regulation reference X % REF 140 prior to the synchronous on signal SR_ON 141 indicating that the output rectifier S2 114 has turned ON during the same switching cycle, the enable signal EN 144 is asserted with the turn ON of the output rectifier S2 114 during the current switching cycle. If the feedback signal FB 124 is greater than the percentage of the regulation reference X % REF 140 after the synchronous on signal SR_ON 141 indicates that the output rectifier S2 114 has turned ON, the enable signal EN 144 is not asserted until the next switching cycle in which the output rectifier S2 114 turns ON (as shown in the example of FIG. 4A). Once the enable signal EN 144 is asserted, the quiet signal 136 is asserted to prevent request events 128 from being sent to the first controller 121. By preventing request events 128 from being sent, the power switch S1 112 is also prevented from turning ON, which may force the power converter 100 to operate in DCM such that the relaxation ring in the output winding FWD 123.

The measurement enable circuit 138 transitions to an enabled measurement state 378 once the enable signal EN 144 is asserted. During at least a portion of this state 379, both the enable signal EN 144 is and the quiet signal 136 are asserted. Once the DCM signal 142 indicates that the power converter 100 is operating in DCM, a first duration $T_{OS}$ is added to the duration of the quiet signal 136 (as will be shown in FIG. 4A). In one embodiment, a monostable multivibrator (also referred to as a one-shot) is triggered by the DCM signal 142 indicating that the power converter 100 is operating in DCM. The quiet signal 136 is deasserted when the first duration ends. However, in one embodiment, the enable signal EN 144 is deasserted prior to the ending of the first duration and the quiet signal 136 may be deasserted when the enable signal EN 144 is deasserted. In one embodiment, the enable signal EN 144 is deasserted is response to the secondary control signal SEC_CTRL 135 being is deasserted. The measurement enable circuit 138 returns to the idle state when the secondary control signal SEC_CTRL 135 indicates that the second controller 122 no longer has control of the output regulation (e.g., the secondary control signal SEC_CTRL 135 is deasserted). Once the measurement enable circuit 138 returns to the idle state, the enable signal EN 144 is deasserted.

In another embodiment in which the measurement enable circuit 138 receives the complete signal CMPL 143, the measurement enable circuit 138 may dessert the enable signal EN when the complete signal CMPL 143 indicates that the half cycle measurement of the winding signal FWD 123 for the half cycle reference HC_REF 370 has been completed by the half cycle windows circuit 361. For this embodiment, the extremum locator switching window generator 146 utilizes the secondary control signal SEC_CTRL 135 to return to an idle state of the extremum locator switching window generator 146.

Returning to FIG. 3A, extremum locator switching window generator 146 is coupled to receive the quiet signal 136, the DCM signal 142, enable signal EN 144, output of comparator 147, and a trim signal QRZV 148. Extremum locator switching window generator 146 may also optionally receive the secondary control signal SEC_CTRL 135. Comparator 147 is coupled to receive the winding signal FWD 123 and the output voltage VOUT 116. In one example, the winding signal FWD 123 is received at the non-inverting input while the output voltage VOUT 116 is received at the inverting input of comparator 147. The extremum locator switching window generator 146 outputs the switching signal SW 137, which is representative of when the second controller 122 may output request events 128 in the request signal REQ 127. When the power converter 100 is operating in DCM, the extremum locator switching window generator 146 outputs switching windows in the switching signal SW 137 which corresponds to extremums in the relaxation ring of the winding signal FWD 123. When the trim signal QRZV 148 indicates that the second controller 122 is operating in QR mode, the extremum locator switching window generator 146 outputs switching windows in the switching signal SW 137 which corresponds to peaks in the relaxation ring of the winding signal FWD 123. When the trim signal QRZV 148 indicates that the second controller 122 is operating in ZV mode, the extremum locator switching window generator 146 outputs switching windows in the switching signal SW 137 which corresponds to valleys in the relaxation ring of the winding signal FWD 123.

In embodiments, the extremum locator switching window generator 146 determines the extremum of the winding signal FWD 123 by measuring the half cycle of the relaxation ring of the winding signal FWD 123. The extremum locator switching window generator 146 also determines half cycle reference HC_REF 370 from the measured half cycle, which is utilized to output the switching windows in the switching window signal SW 137. As shown, the extremum locator switching window generator 146 includes a half cycle windows circuit 361, a timer 363, analog-to-digital converter (ADC) and memory circuit 368, reference generator 371, comparators 374 and 375, AND gates 376 and 398, and OR gate 397.

Half cycle windows circuit 361 is coupled to receive DCM signal 142, enable signal EN 144, output of comparator 147 (e.g. the comparison result of the winding signal FWD 123 and output voltage VOUT 116), and trim signal QRZV 148. The half cycle windows circuit 361 may also optionally receive the secondary control signal SEC_CTRL 135. In response to the comparison between the winding signal FWD 123 and output voltage VOUT 116, the half cycle windows circuit 361 outputs the half cycle signal THC 354. The half cycle signal THC 354 is representative of the half cycle of the relaxation ring of the winding signal FWD 123. In one embodiment, the half cycle signal THC 354 is not outputted until the enable signal EN 144 is asserted. Once the enable signal EN 144 is asserted, the half cycle windows circuit 361 may output the half cycle signal THC 354. The trim signal QRZV 148 indicates whether the half cycle windows circuit 361 is operating in QR control mode or ZV control mode. If the half cycle windows circuit 361 is operating in QR control mode, the half cycle signal THC 354 is representative of the half cycle of the relaxation ring of the winding signal FWD 123 when the winding signal FWD 123 is greater than the output voltage VOUT 116. If the half cycle windows circuit 361 is operating in ZV mode, the half cycle signal THC 354 is representative of the half cycle of the relaxation ring of the winding signal FWD 123 when the winding signal FWD 123 is less than the output voltage VOUT 116. Further, measurement of the half cycle relaxation ring does not begin until after the DCM signal 142 indicates that the power converter 100 is operating in DCM.

The timer 363 is shown as including a current source 364, switch 365, and capacitance 366. The voltage across the capacitance 366 is referred to the half cycle voltage VHC 367. The half cycle voltage VHC 367 is a voltage value representative of the duration of the half cycle signal THC 354. In one example, the half cycle signal THC 354 is a rectangular pulse waveform of varying lengths of logic high and logic low sections. If the half cycle windows circuit 361 is operating in ZV control mode, the half cycle signal THC 354 is logic high when the winding signal FWD 123 is less than the output voltage VOUT 116 after the DCM sense signal 142 indicates the power converter 100 is operating in DCM. If the half cycle windows circuit 361 is operating in QR control mode, the half cycle signal THC 354 is logic high when the winding signal FWD 123 is greater than the output voltage VOUT 116 after the DCM sense signal 142 indicates the power converter 100 is operating in DCM. In one example, the switch 365 is ON when the half cycle signal THC 354 is logic high and turns OFF when the half cycle signal THC 354 is logic low. When the switch 365 is ON, the capacitance 366 is charged by the current source 364 and the half cycle voltage VHC 367 is representative of the duration which the half cycle signal THC 354 is logic high. Although not shown, once the switch 365 turns off, the capacitance 366 is discharged to an initial reference value.

In response to the enable signal EN 144, the half cycle windows circuit 361 begins the process of measuring the half cycle of the relaxation ring and for the extremum locator switching window generator 146 to eventually store the half cycle signal THC 354 and generate a half cycle reference HC_REF 370. The half cycle windows circuit 361 determines the measurement for the half cycle reference HC_REF 370 is complete in response to the number of crossings of the winding signal FWD 123 with the output voltage VOUT 116. For example, if the half cycle windows circuit 361 is operating in QR control mode, the half cycle windows circuit 361 determines the measurement is complete when the winding signal FWD 123 has crossed the output voltage VOUT 116 twice after the DCM signal 142 indicates that the power converter 100 is operating in DCM. If the half cycle windows circuit 361 is operating in ZV control mode, the half cycle windows circuit 361 determines the measurement is complete when the winding signal FWD 123 has crossed the output voltage VOUT 116 three times after the DCM signal 142 indicates that the power converter 100 is operating in DCM. Once the half cycle windows circuit 361 determines the measurement for the half cycle reference HC_REF 370 is complete, the half cycle windows circuit 361 asserts the complete signal CMPL 143 indicating that the measurement of the half cycle is complete. As shown, the complete signal CMPL 143 is provided to the ADC and memory circuit 368. Optionally, the complete signal CMPL 143 is provided to the measurement enable circuit 138.

The ADC and memory circuit 368 is coupled to receive the half cycle voltage VHC 367 and the complete signal CMPL 143 and is configured to output the ready signal READY 369 and the half cycle reference HC_REF 370. When the complete signal CMPL 143 is asserted, the ADC and memory circuit 368 converts the half cycle voltage VHC 367 into a digital value, the half cycle reference HC_REF 370 and stores the half cycle reference HC_REF 370. The ready signal 369 is representative of the ADC and memory circuit 368 completing the conversion and storage of the half cycle reference HC_REF 370. Once the ADC and memory circuit 368 has completed the conversion and storage of the half cycle reference HC_REF 370, the ready signal 369 is asserted.

The reference generator 371 receives the half cycle reference HC_REF 370 and generates a first reference R1 372 and a second reference R2 373. The first and second references R1 372 and R2 373 are utilized to determine the beginning and end of the switching windows of the switching signal SW 137. The first and second references R1 372 and R2 373 are selected to be a certain percentage of the half cycle reference HC_REF 370 (and ergo the half cycle voltage VHC 367), which corresponds to the extremum of the relaxation ring of the winding signal FWD 123. In one example, the first reference R1 372 is selected to be the 30% of the half cycle reference HC_REF 370 and the second reference R2 373 is selected to be 50% of the half cycle reference HC_REF 370.

Comparator 374 is coupled to receive the first reference R1 372 and the half cycle voltage VHC 367. As shown, the first reference R1 372 is received and the inverting input of comparator 374 while the half cycle voltage VHC 367 is received at the non-inverting input of comparator 374. Comparator 375 is coupled to receive the second reference R2 373 and the half cycle voltage VHC 367. As shown, the second reference R2 373 is received at the non-inverting input while the half cycle voltage VHC 367 is received at the inverting input of comparator 375. The outputs of comparator 374 and 375 are received by the AND gate 376. In operation, the output of AND gate 376 is logic high when the half cycle voltage VHC 367 is greater than the first reference R1 372 and less than the second reference R2 373, otherwise the output of AND gate 376 is logic low.

AND gates 376 and 398 and OR gate 397 comprise a logic circuit which outputs the switching window signal SW 137, and specifically the switching windows in the switching window signal SW 137. It should be appreciated that other combinations of logic gates may be used depending on how the various signals are defined. OR gate 397 is coupled to receive the output of AND gate 376 and the inverted ready signal 369, as illustrated by the small circle at the input of OR gate 397 which received the ready signal 369. Further, AND gate 398 is coupled to receive the output of OR gate 397 and the inverted quiet signal 135, as illustrated by the small circle at the input of AND gate 398 which receives the quiet signal 136.

As mentioned previously, in one example the SR control and request circuit 132 is not prevented from sending request events 128 when the switching signal SW 137 is logic high and is prevented from sending request events 128 when the switching signal SW 137 is logic low. In operation of the example shown, the switching signal SW 137 is logic low when the quiet signal 136 is logic high (e.g., asserted). However, if the quiet signal 136 is logic low (e.g. not asserted) and the ready signal 369 is logic low (e.g. not asserted), indicating that either the measurement and storage of the half cycle reference HC_REF 370 has not been completed but the quiet duration by the measurement enable circuit 138 is completed, the output of the switching signal SW 137 is logic high and the SR control and request circuit 132 is not prevented from sending request events 128. However, once the ready signal is logic high (e.g. asserted), indicating that the measurement and storage of the half cycle reference HC_REF 370 has been completed, then the logic value of the switching signal SW 137 is responsive to the value of the half cycle voltage VHC 367 compared to the first reference R1 372 and the second reference R2 373. Or in other words, the switching signal SW 137 is logic high when the half cycle voltage VHC 367 is greater than the first reference R1 372 and less than the second reference R2 373. As such, the request events 128 may be synchronized with extremums in the winding signal FWD 123.

Figure 3C:
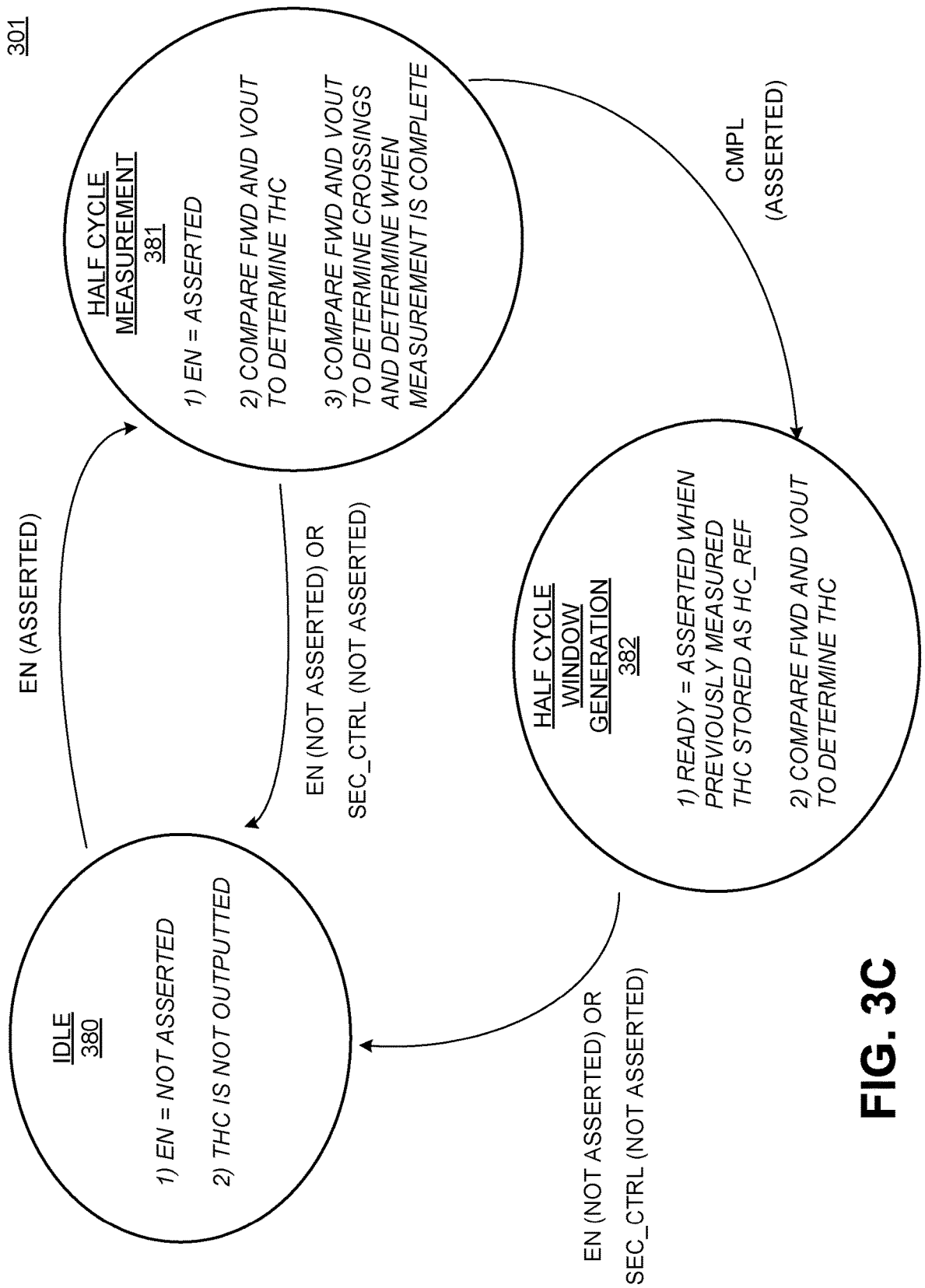
FIG. 3C is a state diagram for the extremum locator switching window generator of FIG. 3A, in accordance with an embodiment of the present disclosure.

FIG. 3C illustrates a state diagram 301 of the operation of the half cycle window circuit 361. With reference to FIGS. 3A and 3C, the half cycle window circuit 361 is in an idle state 380 when the secondary control signal enable signal EN 144 is not asserted. Once the enable signal EN 144 is asserted, the half cycle window circuit 361 transitions to a measurement state 381. During the measurement state 381, the half cycle window circuit 361 the half cycle window circuit 361 determines the half cycle THC 354 in response to the comparison of the winding signal FWD 123 to the output voltage VOUT 116 (e.g. the output of comparator 147). However, the half cycle window circuit 361 does not measure the half line cycle until the DCM signal 142 indicates that the power converter 100 is in DCM. Further, during the measurement state 381, the half cycle window circuit 361 compares the number of crossings of the winding signal FWD 123 to the output voltage VOUT 116 after the DCM signal 142 indicates that the power converter 100 is in DCM. The number of crossings determines whether the measurement of the half cycle signal THC 354 is complete. Once the expected number of crossings has occurred, the complete signal CMPL 143 is asserted. For QR control mode, the complete signal CMPL 143 is asserted after two crossings have occurred after the DCM signal 142 has been asserted. For ZR control mode, the complete signal CMPL is asserted after three crossings have occurred after the DCM signal 142 has been asserted.

When the complete signal CMPL 143 is asserted, the half cycle window circuit 361 transitions to the window generation state 382. The previously measured half cycle THC 354 is stored as the half cycle reference HC_REF 370. The half cycle window circuit 361 continues to compare the winding signal FWD 123 with the output voltage VOUT 116 to determine the half cycle signal THC 354 for subsequent switching cycles of the power switch S1 112. If the trim signal QRZV 148 indicates QR control mode, half cycle window circuit 361 measures the half cycle signal THC 354 in response to the winding signal FWD 123 being greater than the output voltage VOUT 116 after the DCM sense signal 142 indicates DCM operation. If the trim signal QRZV 148 indicates ZV control mode, the half cycle window circuit 361 measures the half cycle signal THC 354 in response to the winding signal FWD 123 being less than the output voltage VOUT 116 after the DCM sense signal 142 indicates DCM operation. Both the measurement state 381 and the window generation state 382 return to the idle state 380 if the enable signal EN 144 is not asserted or the secondary control signal SEC_CTRL 135 indicates that the second controller 122 is not in control of output regulation (e.g. deasserted).

FIG. 4A illustrates a timing diagram 400 of the winding signal FWD 123, synchronous on signal SR_ON 141, the output 438 of comparator 139 comparing the feedback signal FB 124 with the percentage of the regulation reference X % REF 140, the enable signal EN 144, the complete signal CMPL 143, DCM signal 142, quiet signal 136, and the switching signal SW 137. For the example shown, the waveforms correspond with the measurement enable circuit 138 enabling the extremum locator switching window generator 146. Further, the secondary control signal SEC_CTRL 135 is asserted for the duration shown, indicating the second controller 122 has control of the output regulation. It should be appreciated that similarly named and numbered elements couple and function as described above.

At time $t_4$ 403, the power switch S1 112 is ON and the voltage of the winding signal FWD 123 is substantially equal to the input voltage $V_{IN}$ 102 multiplied by the turns ratio of the energy transfer element T1 106. The synchronous on signal SR_ON 141, the output 438 of comparator 139 comparing the feedback signal FB 124 with the percentage of the regulation reference X % REF 140, the enable signal EN 144, the complete signal CMPL 143, DCM signal 142, and the quiet signal 136 are logic low between times $t_4$ 403 and $t_5$ 404. During this time, the ready signal 369 is logic low, as such the switching signal SW 137 is logic high and the SR control and request circuit 132 is not prevented from sending request events 128 in the request signal REQ 127.

At time $t_5$ 404, the power switch S1 112 is turned off and the duration times $t_4$ 403 and $t_5$ 404 is denoted as the on-time $T_{ON}$ 451 of the power switch S1 112. The body diode of the output rectifier S2 114 begins conducting and the synchronous on signal SR_ON 141 pulses to a logic high value. In one example, the voltage of the winding signal FWD 123 may be utilized when the synchronous on signal SR_ON 141 should be asserted. For example, the voltage of the winding signal FWD 123 falling below a threshold (such as zero) could indicate that the synchronous on signal SR_ON 141 should be asserted. In another example, the slew rate of the winding signal FWD 123 may be utilized to determine if the synchronous on signal SR_ON 141 should be asserted.

At time $t_6$ 405, the body diode of the output rectifier S2 114 stops conducting while the power switch S1 112 is still OFF. As such, the power converter 100 is operating in DCM and a relaxation ring is observable in the winding signal FWD 123. The DCM signal 142 is asserted at time $t_6$ 405. In the example shown, the DCM signal 142 pulses at time $t_6$ 405. However, the DCM signal 142 may be a rectangular pulse waveform which is logic high when the winding signal FWD 123 is less than zero, indicating that the body diode of the output rectifier S2 114 is still conducting (CCM). For that example, the trailing edge at time $t_6$ 405 indicates that the power converter 100 is operating in DCM. However, at time $t_6$ 405, the feedback signal FB 124 is less than the percentage of the regulation reference X % REF 140 and the output 438 of comparator 139 is logic low and the enable signal EN 144 remains logic low. At time $t_7$ 406, the power switch S1 112 turns on and the off-time $T_{OFF}$ 452 of the power switch S1 112 ends.

During the off-time $T_{OFF}$ 452 of the power switch S1 112 between times $t_6$ 405 and $t_7$ 406, the feedback signal FB 124 exceeds the percentage of the regulation reference X % REF 140 and the output 438 of comparator 139 is logic high. However, the enable signal EN 144 does not transition to a logic high value until the next time the synchronous on signal SR_ON 141 is asserted at time $t_8$ 407 (corresponding with the body diode e of the output rectifier S2 114 conducting for the next switching cycle).

At time $t_8$ 407, the enable signal EN 144 and the quiet signal 136 transition to a logic high value. As a result, the switching signal SW 137 transitions to a logic low value to prevent the SR control and request circuit 132 from sending request events 128. At time $t_9$ 408, the DCM signal 142 is asserted and a first duration TOS 483 is triggered by the measurement enable circuit 138 for the quiet signal 136. For the example shown, the quiet signal 136 remains logic high until the end of the first duration TOS 483 at time $t_{13}$ 412 and ergo the switching signal SW 137 remains logic low until time $t_{13}$ 412. However alternatively, the quiet signal 136 can transition to the logic low value once the enable signal EN 144 is deasserted at time $t_{12}$ 411 and the switching signal SW 137 could remain logic low until time $t_{12}$ 411.

The example shown in FIG. 4A illustrates a second controller 122 operating in ZV control mode. As such, the extremum locator switching window generator 146 determines the half cycle measurement is complete after three crossings of winding signal FWD 123 with the output voltage VOUT 116 after the DCM signal 142 is asserted. As shown, the DCM signal 142 is asserted at time $t_9$ 408. The first crossing of the winding signal FWD 123 with the output voltage VOUT 116 occurs at time $t_{10}$ 409, the second crossing at time $t_{11}$ 410, and the third crossing at time $t_{12}$ 411. At time $t_{12}$ 411, the complete signal CMPL 143 is asserted.

Figure 4B:
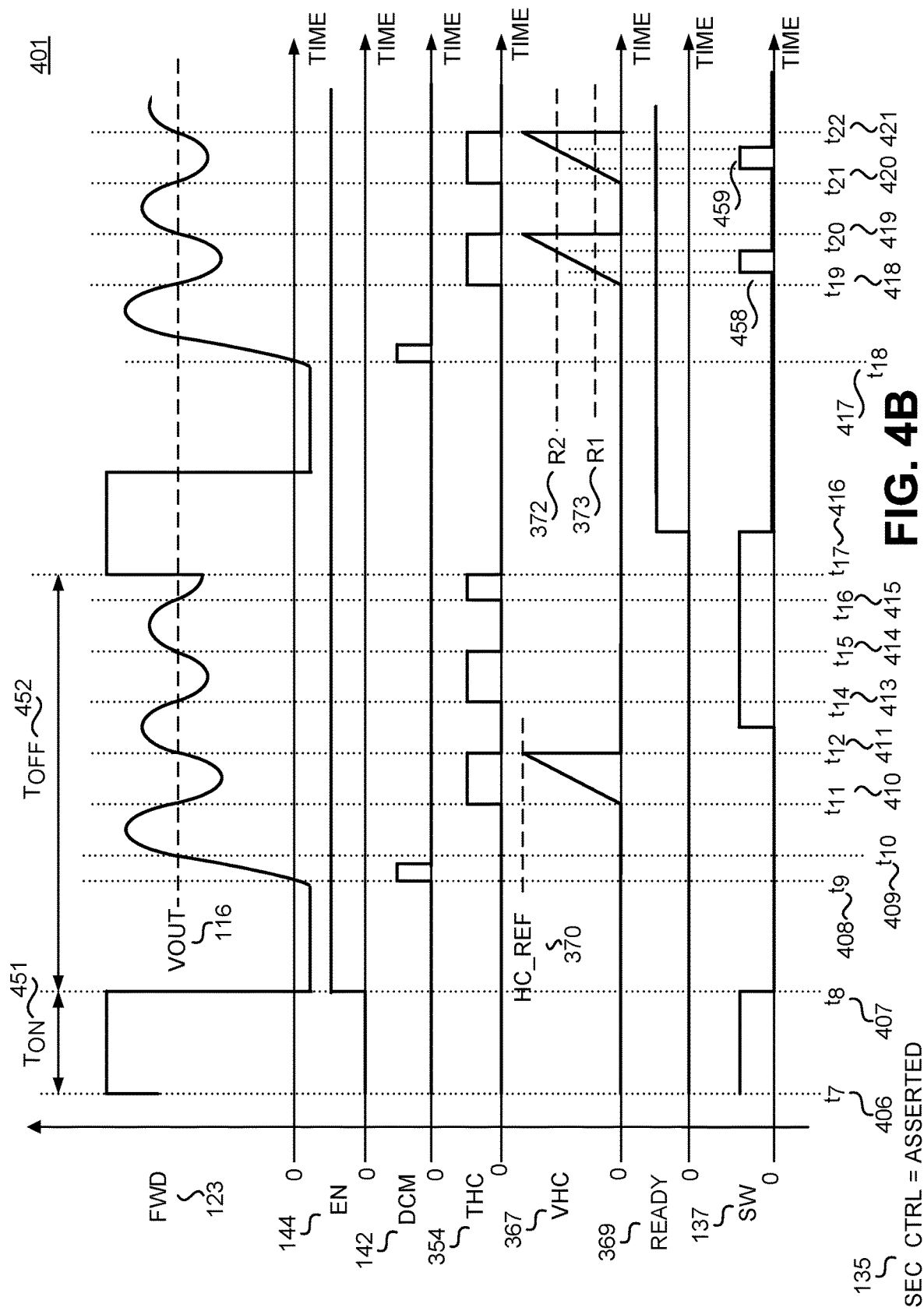
FIG. 4B is a timing diagram illustrating various waveforms for the second controller of FIG. 3A including the extremum locator switching window generator and measurement enable circuit corresponding with the extremum locator switching window generator measuring and generator a half cycle reference, in accordance with an embodiment of the present disclosure.

FIG. 4B illustrates a timing diagram 401 illustrating the winding signal FWD 123, the enable signal EN 144, DCM signal 142, half cycle signal THC 354, half cycle voltage VHC 367, ready signal 369 and the switching signal SW 137. For the example shown, the waveforms correspond with the extremum locator switching window generator 146 determining the half cycle reference HC_REF 370 to generate switching windows 458 and 459 which correspond to extremums in the winding signal FWD 123 in the switching signal SW 137. Further, the secondary control signal SEC_CTRL 135 is asserted for the duration shown, indicating the second controller 122 has control of the output regulation. It should be appreciated that similarly named and numbered elements couple and function as described above. Further, the timing shown in FIG. 4B is a continuation of the timing shown in FIG. 4A.

At time $t_8$ 407, the enable signal EN 144 is logic high, enabling the half cycle window circuit 361 to output the half cycle signal THC 354. Further, the quiet signal 136 is asserted (as shown in FIG. 4A) and the switching signal SW 137 is a logic low value. The example shown illustrates a second controller 122 operating in ZV control mode. As such, the half cycle signal THC 354 is logic high when the winding signal FWD 123 is less than the output voltage VOUT 116. However, the half cycle window circuit 361 does not transition the half cycle signal THC 354 to a logic high value until after the DCM sense signal 142 is asserted per switching cycle, shown at time $t_9$ 408 and time $t_{18}$ 417.

At time $t_{11}$ 410, the winding signal FWD 123 is less than the output voltage VOUT 116 and the half cycle signal THC 354 transitions to a logic high value. The switch 365 of timer 363 is turned on and the capacitance 366 is charged by current source 364. The voltage across the capacitance 366, the half cycle voltage VHC 367, is shown as linearly increasing after time $t_{11}$ 410. The half cycle signal THC 354 remains logic high until time $t_{12}$ 411, when the winding signal FWD 123 increases above the output voltage VOUT 116. As mentioned with respect to FIG. 4A, the third crossing occurs at time $t_{12}$ 411 and the complete signal CMPL 143 is asserted. The half cycle voltage VHC 367 at time $t_{12}$ 411 is substantially the analog version of the half cycle reference HC_REF 370.

The switching signal transitions to a logic high value at time $t_{13}$ 412 (as shown in FIG. 4A), but could optionally transition to a logic high value at time $t_{12}$ 412 as discussed above. While the ready signal 369 remains logic low, the switching signal SW 137 remains logic high. After time $t_{12}$ 411 the analog version of the half cycle reference HC_REF 370 is converted and stored as a digital value. Once the storing is complete, the ready signal 369 transitions to a logic high value. The half cycle signal THC 354 is logic high between times $t_{14}$ 413 and $t_{15}$ 414 and between times $t_{16}$ 415 and $t_{17}$ 416. However, since the ready signal 369 is still logic low, there switching window in the switching window signal SW 137 does not correspond with the extremum of the winding signal FWD 123.

At time $t_{17}$ 416, the power switch S1 112 turns ON. At time $t_{18}$ 417, the DCM signal 142 is asserted. Between times $t_{17}$ 416 and $t_{18}$ 417, the ready signal 369 transitions to a logic high value, indicating the half cycle reference HC_REF 370 is converted and stored. The reference generator 371 outputs the first reference R1 373 and the second reference R2 373, relating to the beginning and ending of the switching windows 458 and 459.

Between times $t_{19}$ 418 and $t_{20}$ 419 and between times $t_{21}$ 420 and $t_{22}$ 421, the winding signal FWD 123 is less than the output voltage VOUT 116 and the half cycle signal THC 354 is logic low. The half cycle voltage VHC 367 increases. Between times $t_{19}$ 418 and $t_{20}$ 419 and between times $t_{21}$ 420 and $t_{22}$ 421, the half cycle voltage VHC 367 is greater than the first reference R1 373 and less than the second reference R2 372 and switching signal SW 137 transitions to a logic high value. The logic high sections are switching windows 458 and 459, which correspond to extremums (in this example, valleys) in the relaxation ring of the winding signal FWD 123. As such, switching losses may be minimized by sending request events 128 in the request signal REQ 127 corresponding to extremums in the winding signal FWD 123 when the power converter 100 is operating in DCM.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

Although the present invention is defined in the claims, it should be understood that the present invention can alternatively be defined in accordance with the following examples: Example 1. A controller for use in a power converter having an energy transfer element for transferring energy between an input and an output of the power converter, the controller comprising a first controller configured to generate a first drive signal to control switching of a power switch of the power converter to control the transfer of energy between the input and the output of the power converter, the first controller coupled to receive a request signal and configured to generate the first drive signal in response to a request event in the request signal; and a second controller configured to generate the request event and the request signal in response to a feedback signal representative of an output of the power converter and a switching window signal, the second controller configured to transmit the request event in the request signal during a switching window of the switching window signal, the second controller further comprising: an extremum locator switching window generator configured to generate the switching window signal in response to a winding signal of the energy transfer element which oscillates in response to a completion of the transfer of energy to the output, the extremum locator switching window generator configured to generate the switching window corresponding with an extremum in the winding signal; and a measurement enable circuit configured to output an enable signal to enable the extremum locator switching window generator to measure a duration of a half cycle of a relaxation ring of the winding signal and to generate a half cycle reference utilized to generate the switching window of the switching window signal, the measurement enable circuit further configured to enable the extremum locator switching window generator in response to the feedback signal reaching a percentage of a target reference for regulating the output of the power converter, the measurement enable circuit further configured to output a quiet signal to prevent the second controller from transmitting the request event in the request signal in response to the quiet signal.

Example 2. The controller of example 1, wherein the enable signal is asserted when the feedback signal reaches the percentage of the target reference substantially with a turn-on of a rectifier.

Example 3. The controller of examples 2 or 3, wherein the rectifier is a synchronous rectifier (SR) and the enable signal is asserted with a synchronous on signal to turn on the synchronous rectifier, and the synchronous on signal is asserted when the winding signal falls below a synchronous rectifier (SR)-on threshold.

Example 4. The controller of any one of examples 1 to 3, wherein the SR-on threshold is substantially zero volts.

Example 5. The controller of any one of examples 1 to 4, wherein the quiet signal is asserted when the enable signal is asserted.

Example 6. The controller of any one of examples 1 to 5, the second controller further comprising: a discontinuous conduction mode (DCM) sense circuit coupled to receive the winding signal and configured to output a DCM signal in response to the winding signal, the DCM signal representative of the power converter operating in discontinuous conduction mode, the quiet signal asserted for at most a first duration after the DCM signal is asserted.

Example 7. The controller of any one of examples 1 to 6, wherein the quiet signal is deasserted when the first duration is completed or the enable signal is deasserted.

Example 8. The controller of any one of examples 1 to 7, wherein the first duration is a duration of a monostable multivibrator.

Example 9. The controller of any one of examples 1 to 8, the extremum locator switching window generator further comprising: a half cycle window circuit configured to output a half cycle signal representative of the duration of the half cycle of the relaxation ring in response to a DCM signal representative of the power converter operating in discontinuous conduction mode and a comparison between the winding signal and an output voltage of the power converter when the enable signal is asserted, the half cycle window circuit further configured to output a complete signal in response to the comparison of the winding signal and the output voltage; a timer coupled to receive the half cycle signal and configured to generate a half cycle voltage, the half cycle voltage representative of the duration of the half cycle of the relaxation ring in response to the half cycle signal; and a memory circuit coupled to receive the half cycle voltage and the complete signal, and configured to generate a half cycle reference in response to the half cycle voltage when the complete signal is asserted, the memory circuit further configured to output a ready signal indicating that the half cycle reference has been generated.

Example 10. The controller of any one of examples 1 to 9, wherein the half cycle window circuit is coupled to receive a trim signal, wherein the trim signal is representative of the second controller operating in either quasi-resonant control or zero-voltage control, wherein the half cycle window circuit outputs the half cycle signal in response to the winding signal being greater than the output voltage when the trim signal indicates quasi-resonant control and the switching window corresponds to peaks in the winding signal, and wherein the half cycle window circuit outputs the half cycle signal in response to the winding signal being less than the output voltage when the trim signal indicates zero-voltage control and the switching window corresponds to valleys in the winding signal.

Example 11. The controller of any one of examples 1 to 10, wherein when the trim signal indicates quasi-resonant control, the complete signal is asserted after the winding signal has crossed the output voltage twice after the DCM signal is asserted.

Example 12. The controller of any one of examples 1 to 11, wherein when the trim signal indicates zero-voltage control, the complete signal is asserted after the winding signal has crossed the output voltage three times after the DCM signal is asserted.

Example 13. The controller of any one of examples 1 to 12, the extremum locator switching window generator further comprising: a reference generator coupled to receive the half cycle reference and configured to generate a first reference and a second reference, wherein the switching window is generated in response to a comparison between the first reference and the half cycle voltage and a comparison between the second reference and the half cycle voltage.

Example 14. The controller of any one of examples 1 to 13, the second controller further comprising: an SR control and request circuit coupled to receive the winding signal and the switching window signal, the SR control and request circuit configured to generate the request event and the request signal in response to the feedback signal and the target reference, and to transmit the request event during the switching window of the switching window signal, the SR control and request circuit further configured to output a synchronous drive signal to control the switching of a synchronous rectifier coupled to the output of the power converter in response to the winding signal.

Example 15. The controller of any one of examples 1 to 16, wherein the first controller is configured to generate a clamp drive signal to control switching of a clamp switch of an active clamp circuit coupled across the energy transfer element, the first controller coupled to receive the request signal and further configured to generate the clamp drive signal in response to a request event in the request signal, wherein the first drive signal is outputted to turn on the power switch after the clamp drive signal is outputted to turn off the clamp switch.

Example 16. A method of determining a switching window for a request event in a request signal of a controller of a power converter, the method comprising: determining when a feedback signal representative of an output of the power converter is greater than a percentage of a target reference for regulating the output of the power converter; determining when a rectifier is turned on; enabling an extremum locator switching window generator to measure a duration of a half cycle of a relaxation ring of a winding signal representative of an output winding of an energy transfer element and to generate a half cycle reference; generating a quiet signal to prevent a power switch from turning on; determining that the power converter is operating in discontinuous conduction mode; measuring the duration of the half cycle by a switching window generator by comparing the winding signal to an output voltage of the power converter after determining that the power converter is operating in discontinuous conduction mode; storing the half cycle reference in response to the completion of the duration of the half cycle of the relaxation ring; and utilizing the half cycle reference to determine the switching window.

Example 17. The method of example 16, further comprising: asserting the quiet signal to prevent the turn on of the power switch from occurring after the enabling of the extremum locator switching window generator to measure the duration of the half cycle; triggering a mono stable multivibrator to continue asserting the quiet signal after determining that the power converter is operating in discontinuous conduction mode; and deasserting the quiet signal to allow turn on of the power switch after the triggering of the mono stable multivibrator has ended.

Example 18. The method of examples 16 or 17 wherein enabling an extremum locator switching window generator further comprises: synchronizing the enabling of the extremum locator switching generator when the feedback signal is greater than the percentage of the target reference corresponding with the determining that the rectifier is turned on.

What is claimed is:

1. A controller for use in a power converter having an energy transfer element for transferring energy between an input and an output of the power converter, the controller comprising:
    a first controller configured to generate a first drive signal to control switching of a power switch of the power converter to control the transfer of energy between the input and the output of the power converter, the first controller coupled to receive a request signal and configured to generate the first drive signal in response to a request event in the request signal, wherein the request event is representative of a request to turn ON the power switch; and
    a second controller configured to generate the request event and the request signal in response to a feedback signal representative of the output of the power converter and a switching window signal, the second controller configured to transmit the request event in the request signal to turn ON the power switch during a switching window of the switching window signal, the second controller further comprising:
        an extremum locator switching window generator configured to generate the switching window signal in response to a winding signal of the energy transfer element which oscillates in response to a completion of the transfer of energy to the output of the power converter, the extremum locator switching window generator configured to generate the switching window corresponding with an extremum in the winding signal, the extremum locator switching window generator further comprising:
            a half cycle window circuit configured to output a half cycle signal representative of the duration of the half cycle of the relaxation ring in response to a DCM signal representative of the power converter operating in discontinuous conduction mode and a comparison between the winding signal and an output voltage of the power converter when the enable signal is asserted, the half cycle window circuit further configured to output a complete signal in response to the comparison of the winding signal and the output voltage of the power converter;
            a timer coupled to receive the half cycle signal and configured to generate a half cycle voltage, the half cycle voltage representative of the duration of the half cycle of the relaxation ring in response to the half cycle signal; and
            a memory circuit coupled to receive the half cycle voltage and the complete signal, and configured to generate a half cycle reference in response to the half cycle voltage when the complete signal is asserted, the memory circuit further configured to output a ready signal indicating that the half cycle reference has been generated; and
        a measurement enable circuit configured to output an enable signal to enable the extremum locator switching window generator to measure a duration of a half cycle of a relaxation ring of the winding signal and to generate a half cycle reference utilized to generate the switching window of the switching window signal, the measurement enable circuit further configured to enable the extremum locator switching window generator in response to the feedback signal reaching a percentage of a target reference for regulating the output of the power converter, the measurement enable circuit further configured to output a quiet signal to prevent the second controller from transmitting the request event in the request signal.

2. The controller of claim 1, the extremum locator switching window generator further comprising:
    a reference generator coupled to receive the half cycle reference and configured to generate a first reference and a second reference, wherein the switching window is generated in response to a comparison between the first reference and the half cycle voltage and a comparison between the second reference and the half cycle voltage.

3. The controller of claim 1, the second controller further comprising:
    an SR control and request circuit coupled to receive the winding signal and the switching window signal, the SR control and request circuit configured to generate the request event and the request signal in response to the feedback signal and the target reference, and to transmit the request event during the switching window of the switching window signal, the SR control and request circuit further configured to output a synchronous drive signal to control the switching of a synchronous rectifier coupled to the output of the power converter in response to the winding signal.

4. The controller of claim 1, wherein the first controller is configured to generate a clamp drive signal to control switching of a clamp switch of an active clamp circuit coupled across the energy transfer element, the first controller coupled to receive the request signal and further configured to generate the clamp drive signal in response to the request event in the request signal, wherein the first drive signal is outputted to turn ON the power switch after the clamp drive signal is outputted to turn off the clamp switch.

5. The controller of claim 1, wherein the enable signal is asserted when the feedback signal reaches the percentage of the target reference and is substantially synchronized with a turn ON of a rectifier.

6. The controller of claim 5, wherein the rectifier is a synchronous rectifier (SR) and the enable signal is asserted with a synchronous on signal to turn ON the synchronous rectifier (SR), and the synchronous on signal is asserted when the winding signal falls below a synchronous rectifier (SR)-on threshold.

7. The controller of claim 6, wherein the synchronous rectifier (SR)-on threshold is substantially zero volts.

8. The controller of claim 1, wherein the quiet signal is asserted when the enable signal is asserted.

9. The controller of claim 8, the second controller further comprising:
a discontinuous conduction mode (DCM) sense circuit coupled to receive the winding signal and configured to output a DCM signal in response to the winding signal, the DCM signal representative of the power converter operating in discontinuous conduction mode, the quiet signal asserted for at most a first duration after the DCM signal is asserted.

10. The controller of claim 9, wherein the quiet signal is deasserted when the first duration is completed or the enable signal is deasserted.

11. The controller of claim 9, wherein the first duration is a duration of a monostable multivibrator.

12. The controller of claim 1, wherein the half cycle window circuit is coupled to receive a trim signal, wherein the trim signal is representative of the second controller operating in either quasi-resonant control or zero-voltage control, wherein the half cycle window circuit outputs the half cycle signal in response to the winding signal being greater than the output voltage of the power converter when the trim signal indicates quasi-resonant control and the switching window corresponds to peaks in the winding signal, and wherein the half cycle window circuit outputs the half cycle signal in response to the winding signal being less than the output voltage of the power converter when the trim signal indicates zero-voltage control and the switching window corresponds to valleys in the winding signal.

13. The controller of claim 12, wherein when the trim signal indicates quasi-resonant control, the complete signal is asserted after the winding signal has crossed the output voltage of the power converter twice after the DCM signal is asserted.

14. The controller of claim 12, wherein when the trim signal indicates zero-voltage control, the complete signal is asserted after the winding signal has crossed the output voltage of the power converter three times after the DCM signal is asserted.

* * * * *